United States Patent
Goel et al.

(10) Patent No.: US 9,900,172 B2
(45) Date of Patent: Feb. 20, 2018

(54) COORDINATED RESOURCE SHARING IN MACHINE-TO-MACHINE COMMUNICATION USING A NETWORK-BASED GROUP MANAGEMENT AND FLOOR CONTROL MECHANISM

(71) Applicant: QUALCOMM Incorporated, San Diego, CA (US)

(72) Inventors: Amit Goel, San Diego, CA (US); Mohammed Ataur Rahman Shuman, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 248 days.

(21) Appl. No.: 14/260,038

(22) Filed: Apr. 23, 2014

(65) Prior Publication Data
US 2014/0324973 A1 Oct. 30, 2014

Related U.S. Application Data

(60) Provisional application No. 61/816,116, filed on Apr. 25, 2013.

(51) Int. Cl.
*H04L 12/28* (2006.01)
*H04L 29/08* (2006.01)
(Continued)

(52) U.S. Cl.
CPC ...... *H04L 12/2803* (2013.01); *H04L 12/2838* (2013.01); *H04L 67/12* (2013.01);
(Continued)

(58) Field of Classification Search
CPC ......... H04L 47/70; H04L 47/72; H04L 47/74; H04L 47/741; H04L 47/781;
(Continued)

(56) References Cited

U.S. PATENT DOCUMENTS 6,003,061 A * 12/1999 Jones ........................ G06F 9/50
718/102
6,018,690 A * 1/2000 Saito ........................ H02J 3/14
700/293
(Continued)

FOREIGN PATENT DOCUMENTS

| CN | 1481122 A | 3/2004 |
|---|---|---|
| EP | 2369883 A1 | 9/2011 |
| WO | 2008063362 A2 | 5/2008 |

OTHER PUBLICATIONS

Conte et al., "Resource Management in Home Automation Systems," 18th Mediterranean Conference on Control and Automation, Jun. 23-25, 2010, pp. 154-160.*

(Continued)

*Primary Examiner* — Vivek Srivastava
*Assistant Examiner* — William C McBeth
(74) *Attorney, Agent, or Firm* — Muncy, Geissler, Olds & Lowe, P.C.

(57) ABSTRACT

In the network-based group management and floor control mechanism disclosed herein, a server may receive a request to occupy a shared IoT resource from a member device in an IoT device group and transmit a message granting the member IoT device permission to occupy the shared IoT resource based on one or more policies. For example, the granted permission may comprise a floor that blocks other IoT devices from accessing the shared IoT resource while the member IoT device holds the floor. Furthermore, the server may revoke the permission if the member IoT device fails to transmit a keep-alive message before a timeout period expires, a high-priority IoT device pre-empts the floor, and/or based on the policies. Alternatively, the server (Continued)

may make the shared IoT resource available if the member IoT device sends a message that voluntarily releases the floor.

36 Claims, 12 Drawing Sheets

(51) Int. Cl.
*H04W 4/00* (2018.01)
*H04W 4/08* (2009.01)
*H04W 84/18* (2009.01)
*H04L 12/911* (2013.01)
*H04W 4/10* (2009.01)
*H04W 72/12* (2009.01)
*H04W 72/00* (2009.01)

(52) U.S. Cl.
CPC ............ *H04L 67/16* (2013.01); *H04W 4/005* (2013.01); *H04W 4/08* (2013.01); *H04W 84/18* (2013.01); *H04L 47/70* (2013.01); *H04L 2012/285* (2013.01); *H04L 2012/2841* (2013.01); *H04W 4/10* (2013.01); *H04W 72/00* (2013.01); *H04W 72/121* (2013.01)

(58) Field of Classification Search
CPC .............. H04L 65/403; H04L 65/4038; H04L 65/4061; H04L 12/2803; H04L 12/2807; H04L 12/2821; H04L 12/2823; H04L 12/283; H04L 12/2838; H04L 2012/2841; H04L 2012/2843; H04L 2012/285; H04L 67/12; H04L 67/16; H04L 12/2816; H04L 12/282; H04L 12/2827; H04W 4/06; H04W 4/08; H04W 4/10; H04W 76/005; H04W 4/005; H04W 72/00; H04W 72/21; H04W 84/18
USPC .............. 455/507, 509, 512, 518, 519, 528
See application file for complete search history.

(56) References Cited

U.S. PATENT DOCUMENTS

| | | | |
|---|---|---|---|
| 6,314,340 B1* | 11/2001 | Mecham | A01G 25/167 239/69 |
| 6,363,434 B1* | 3/2002 | Eytchison | H04L 12/24 375/E7.019 |
| 7,151,327 B2* | 12/2006 | Merdjan | H02J 3/14 307/35 |
| 7,516,106 B2* | 4/2009 | Ehlers | F24F 11/0012 705/412 |
| 7,561,977 B2* | 7/2009 | Horst | H02J 3/14 700/295 |
| 7,756,054 B2 | 7/2010 | Huh et al. | |
| 8,027,752 B2* | 9/2011 | Castaldo | G06F 9/54 700/295 |
| 8,234,363 B1* | 7/2012 | Kuo | H04L 12/2803 370/329 |
| 8,270,583 B2* | 9/2012 | Newberg | H04W 4/08 379/201.01 |
| 8,296,419 B1* | 10/2012 | Khanna | G06F 9/5072 718/1 |
| 8,694,639 B1* | 4/2014 | Vermeulen | G06F 9/5011 709/226 |
| 2005/0124365 A1* | 6/2005 | Balasuriya | H04W 4/10 455/518 |
| 2005/0240694 A1 | 10/2005 | Tseng et al. | |
| 2006/0031888 A1* | 2/2006 | Sparrell | H04L 12/2821 725/78 |
| 2006/0150244 A1* | 7/2006 | Klein | H04L 12/2803 726/12 |
| 2007/0173273 A1* | 7/2007 | Gogic | H04B 7/026 455/518 |
| 2008/0159177 A1* | 7/2008 | Balachandran | H04W 72/005 370/260 |
| 2009/0055534 A1* | 2/2009 | Sadja | G06F 8/65 709/226 |
| 2009/0288084 A1* | 11/2009 | Astete | G06F 9/45533 718/1 |
| 2010/0228767 A1 | 9/2010 | Slinker et al. | |
| 2010/0267411 A1* | 10/2010 | Allen | H04B 1/3833 455/518 |
| 2011/0292893 A1 | 12/2011 | Lee et al. | |
| 2012/0176976 A1 | 7/2012 | Wells | |
| 2012/0190397 A1* | 7/2012 | Jung | H04W 4/005 455/519 |
| 2013/0029641 A1* | 1/2013 | Hickie | G06F 21/604 455/411 |
| 2013/0054863 A1* | 2/2013 | Imes | H04L 12/2827 710/304 |
| 2013/0331958 A1* | 12/2013 | Bess | G06Q 50/06 700/12 |
| 2014/0047048 A1* | 2/2014 | Ail | H04L 29/08153 709/206 |
| 2014/0316958 A1* | 10/2014 | Alberth, Jr. | G06Q 10/00 705/35 |
| 2016/0323283 A1* | 11/2016 | Kang | H04L 63/105 |
| 2016/0359864 A1* | 12/2016 | Dhaliwal | H04L 63/102 |
| 2017/0155710 A1* | 6/2017 | Quinn | H04L 67/1014 |

OTHER PUBLICATIONS

Conte et al., "Paramter Tuning in Distributed Home Automation Systems: towards a Tabu Search Approach," 16th Mediterranean Conference on Control and Automation, Jun. 2008, pp. 191-197.*
Conte et al., "Applying MAS Theory to Complex Home Automation Systems", Proceedings of the Workshop on Modelling and Control of Complex Systems, 2005.*
Seewald et al., "Demand request dispatch approach for electric distribution systems," 2013 IEEE Electrical Power & Energy Conference, 2013, pp. 1-8.*
International Search Report and Written Opinion—PCT/US2014/035299—ISA/EPO—Jul. 29, 2014.
Guo B., et al., "From the internet of things to embedded intelligence," 2012, pp. 1-29.
Zhang V. et al., "Home M2M Networks:Architectures, standards, and QoS improvement ", IEEE Communications Magazine, IEEE Service Center, Piscataway, US, vol. 49, No. 4, Apr. 1, 2011 (Apr. 1, 2011),pp. 44-52, XP011478242, ISSN: 0163-6804, DOI:10.1109/MCOM.2011.5741145.

* cited by examiner

COORDINATED RESOURCE SHARING IN MACHINE-TO-MACHINE COMMUNICATION USING A NETWORK-BASED GROUP MANAGEMENT AND FLOOR CONTROL MECHANISM

PRIORITY CLAIM UNDER 35 U.S.C. § 119

The present application claims priority to U.S. Provisional Patent Application Ser. No. 61/816,116, entitled "COORDINATED RESOURCE SHARING IN MACHINE-TO-MACHINE COMMUNICATION USING A NETWORK-BASED GROUP MANAGEMENT AND FLOOR CONTROL MECHANISM," filed Apr. 25, 2013, the contents of which are hereby incorporated by reference in their entirety.

TECHNICAL FIELD

Various embodiments described herein are generally directed to coordinated resource sharing in machine-to-machine communications, and in particular, to organizing various Internet of Things (IoT) devices into groups that may work together and operate on one or more shared resources and providing a network-based group management and floor control mechanism to control interaction within and between the IoT device groups and the resources shared among and between the IoT device groups.

BACKGROUND

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines. Furthermore, an important component in the IoT involves machine-to-machine communications, where more and more devices will be interconnected in consumer, industrial, and other spaces. Accordingly, the increased connectivity that the IoT offers will increase the interdependence among and between different devices, resulting in a need to coordinate communication and interaction among and between devices.

SUMMARY

The following presents a simplified summary relating to the network-based group management and floor control mechanism disclosed herein to coordinate resource sharing in machine-to-machine communication in order to provide a basic understanding of such embodiments. As such, this summary should not be considered an extensive overview of all contemplated embodiments, nor is this summary intended to identify key or critical elements of all embodiments described herein or delineate the scope of any particular embodiment. Accordingly, the sole purpose of this summary is to present certain concepts relating to one or more embodiments relating to the network-based group management and floor control mechanism disclosed herein in a simplified form as a prelude to the more detailed description presented below.

The disclosure generally relates to coordinated resource sharing in machine-to-machine communications among and within one or more Internet of Things (IoT) device groups. In particular, various IoT devices that may need to interact with one another and share certain resources may be organized into various IoT device groups to support efficient interaction and coordinate resource sharing among and between the IoT device groups. For example, one or more pre-defined IoT device groups may organize certain IoT devices that perform similar activities or otherwise work together on certain shared resources, and furthermore, certain IoT devices may be dynamically allocated to ad-hoc IoT device groups for certain contexts (e.g., a certain duration or time period, location, during owner presence, based on occupying or using a particular resource, based on having a certain operational state, etc.). Furthermore, the IoT device groups may be organized in a hierarchical manner to rank or otherwise define relative priorities among the various IoT devices allocated therein, wherein messages may be exchanged among IoT group owners or ranking members to support efficient communication between different IoT groups and access to shared resources may be controlled based on the relative rankings or priorities to resolve contending requests to occupy the same shared resources. More particularly, within a distributed IoT network service, IoT devices, IoT device groups, and shared resources may be represented with globally unique identifiers that the distributed IoT network service may use to coordinate resource sharing within an IoT device group and between different IoT device groups. For example, the coordinated resource sharing mechanisms may include, among other things, defining policies that control whether certain IoT devices can access a shared resource, defining policies that enable different IoT device groups to interact with each other and access resources shared with other IoT device groups, and regulating how the shared resources may be utilized (e.g., constraining a resource to one or N users at a time, a maximum usage duration, a certain location or time, etc.).

According to one exemplary embodiment, a method for coordinated resource sharing among IoT devices may comprise, among other things, identifying an IoT device group at a server, wherein the identified IoT device group has one or more member IoT devices that operate on a shared IoT resource, receiving a message that requests permission to occupy the shared IoT resource at the server, wherein the message may originate from a member IoT device in the identified IoT device group, and transmitting a message from the server to the member IoT device, wherein the transmitted message grants the member IoT device the requested permission to occupy the shared IoT resource (e.g., the permission to occupy the shared IoT resource may comprise a floor that blocks other IoT devices from accessing the shared IoT resource while the member IoT device holds the floor). In one embodiment, the message that requests the permission to occupy the shared IoT resource may indicate an amount of the shared IoT resource that the IoT device requests exclusive permission to occupy and the message that grants the member IoT device the requested permission to occupy the shared IoT resource may indicate an amount of the shared IoT resource that the IoT device has been granted permission to occupy. Additionally, the method may further comprise transmitting a message that revokes the granted permission to occupy the shared IoT resource to the member IoT device, wherein the message revoking the granted permission may be transmitted in response to a timeout period expiring without the server receiving a keep-alive message from the member IoT device, in response to an IoT device with a higher priority than the member IoT device requesting access to the shared IoT resource, and/or based on one or more policies that regulate the member IoT device occupying the shared IoT resource. Alternatively, in one embodiment, the method may comprise making the shared IoT resource available in response to a message from the member IoT device that releases the permission to occupy the shared IoT resource.

According to one exemplary embodiment, the method for coordinated resource sharing among IoT devices may further comprise allocating a device-specific globally unique identifier (D_GUID) to each member IoT device that operates on the shared IoT resource and associating one or more attributes with the D_GUID allocated to each member IoT device that operates on the shared IoT resource based on one or more contexts associated with each member IoT device. For example, in one embodiment, the server may allocate the D_GUID to each member IoT device that operates on the shared IoT resource in response to receiving a registration request from each respective member IoT device. Furthermore, in one embodiment, the method may comprise allocating a group-specific globally unique identifier (G_GUID) to the identified IoT device group and associating one or more attributes with the G_GUID allocated to the identified IoT device group based on one or more contexts associated therewith and a resource-specific globally unique identifier (R_GUID) allocated to the shared IoT resource. As such, in response to receiving a message that requests the R_GUID allocated to the shared IoT resource from the member IoT device, the server may select one or more shared IoT resources based on the one or more attributes associated with the D_GUID allocated to the member IoT device and transmit a list that includes the R_GUID allocated to the selected one or more shared IoT resources to the member IoT device, wherein the member IoT device may then select the R_GUID allocated to the shared IoT resource that the member IoT device has requested permission to occupy from the transmitted list. In one embodiment, the server may further maintain statistics or other data that relate to usage associated with the shared IoT resource.

According to one exemplary embodiment, an apparatus for coordinated resource sharing among IoT devices may comprise, among other things, means for identifying an IoT device group having one or more member IoT devices that operate on a shared IoT resource, means for receiving a message that requests permission to occupy the shared IoT resource from a member IoT device in the identified IoT device group, and means for transmitting, to the member IoT device, a message that grants the member IoT device the requested permission to occupy the shared IoT resource (e.g., the permission to occupy the shared IoT resource may comprise a floor that blocks other IoT devices from accessing the shared IoT resource while the member IoT device holds the floor). In one embodiment, the message that requests the permission to occupy the shared IoT resource may indicate an amount of the shared IoT resource that the IoT device requests exclusive permission to occupy and the message that grants the member IoT device the requested permission to occupy the shared IoT resource may indicate an amount of the shared IoT resource that the IoT device has been granted permission to occupy. The apparatus may further comprise means for transmitting a message that revokes the granted permission to occupy the shared IoT resource to the member IoT device in response to a timeout period expiring without the server receiving a keep-alive message from the member IoT device, in response to an IoT device with a higher priority than the member IoT device requesting access to the shared IoT resource, and/or based on one or more policies that regulate the member IoT device occupying the shared IoT resource. Furthermore, the apparatus may comprise means for making the shared IoT resource available in response to a message from the member IoT device releasing the permission to occupy the shared IoT resource.

According to one exemplary embodiment, the apparatus for coordinated resource sharing among IoT devices may further comprise means for allocating a D_GUID to each member IoT device that operates on the shared IoT resource and means for associating one or more attributes with the D_GUID allocated to each member IoT device that operates on the shared IoT resource based on one or more contexts associated with each member IoT device. For example, in one embodiment, the D_GUID may be allocated to each member IoT device that operates on the shared IoT resource in response to the apparatus receiving a registration request from each respective member IoT device. Furthermore, in one embodiment, the apparatus may comprise means for allocating a G_GUID to the identified IoT device group and means for associating one or more attributes with the G_GUID allocated to the identified IoT device group based on one or more contexts associated therewith and an R_GUID allocated to the shared IoT resource. As such, the apparatus may comprise means for selecting one or more shared IoT resources based on the one or more attributes associated with the D_GUID allocated to the member IoT device in response to a message that requests the R_GUID allocated to the shared IoT resource from the member IoT device and means for transmitting a list that includes the R_GUID allocated to the selected one or more shared IoT resources to the member IoT device, wherein the member IoT device may then select the R_GUID allocated to the shared IoT resource that the member IoT device has requested permission to occupy from the transmitted list. In one embodiment, the apparatus may further comprise means for maintaining statistics that relate to usage associated with the shared IoT resource.

According to one exemplary embodiment, an apparatus may comprise at least one processor configured to identify an IoT device group having one or more member IoT devices that operate on a shared IoT resource, receive a message that requests permission to occupy the shared IoT resource from a member IoT device in the identified IoT device group, and transmit, to the member IoT device, a message that grants the member IoT device the requested permission to occupy the shared IoT resource (e.g., the permission to occupy the shared IoT resource may comprise a floor that blocks other IoT devices from accessing the shared IoT resource while the member IoT device holds the floor). Further, in one embodiment, the apparatus may comprise a memory coupled to the at least one processor (e.g., the processor may store statistics or other suitable data that relates to usage associated with the shared IoT resource, globally unique identifiers assigned to the shared IoT resource, the IoT device group, and/or the member IoT device, or other suitable data that may be used to coordinate resource sharing among IoT devices in the memory).

According to one exemplary embodiment, a computer-readable storage medium may have computer-executable instructions recorded thereon, wherein executing the computer-executable instructions on a server may cause the server to coordinate resource sharing among IoT devices. For example, in one embodiment, executing the computer-executable instructions on the server may cause the server to identify an IoT device group having one or more member IoT devices that operate on a shared IoT resource, receive a message that originates from a member IoT device in the identified IoT device group to request permission to occupy the shared IoT resource, and transmit, to the member IoT device, a message that grants the member IoT device the requested permission to occupy the shared IoT resource (e.g., the permission to occupy the shared IoT resource may comprise a floor that blocks other IoT devices from accessing the shared IoT resource while the member IoT device holds the floor).

According to another exemplary embodiment, a method for coordinated resource sharing among IoT devices may comprise an IoT device transmitting a message to a server in order to request permission to occupy a shared IoT resource, wherein the IoT device may be a member in an IoT device group that operates on the shared IoT resource, and the method may further comprise receiving, from the server, a message that grants the member IoT device the requested permission to occupy the shared IoT resource (e.g., the granted permission to occupy the shared IoT resource may comprise a floor that blocks other IoT devices from accessing the shared IoT resource while the member IoT device holds the floor). In one embodiment, the transmitted message that requests the permission to occupy the shared IoT resource may indicate an amount of the shared IoT resource that the IoT device requests exclusive permission to occupy and the received message that grants the member IoT device the requested permission to occupy the shared IoT resource may indicate an amount of the shared IoT resource that the IoT device has been granted permission to occupy. Additionally, in one embodiment, the method may further comprise receiving a message that revokes the granted permission to occupy the shared IoT resource from the server, wherein the server may revoke the permission granted to the member IoT device due to a timeout period expiring without the member IoT device transmitting a keep-alive message to the server, due to an IoT device with a higher priority than the member IoT device requesting access to the shared IoT resource, and/or based on one or more policies that regulate the member IoT device occupying the shared IoT resource. Alternatively, in one embodiment, the member IoT device may transmit a message to the server in order to voluntarily release the permission that was granted to occupy the shared IoT resource.

According to another exemplary embodiment, the method for coordinated resource sharing among IoT devices may further include a registration process in which the IoT device transmits a registration request to the server and receives, from the server, a device-specific globally unique identifier (D_GUID) allocated to the member IoT device and/or a group-specific globally unique identifier (G_GUID) allocated to the IoT device group that includes the member IoT device in response to the registration request. As such, the member IoT device may transmit a message to the server in order to request a resource-specific globally unique identifier (R_GUID) allocated to the shared IoT resource on which the members in the IoT device group associated with the G_GUID operate and select the R_GUID allocated to the shared IoT resource from a list that the server transmits to the member IoT device in response to the message requesting the R_GUID.

According to another exemplary embodiment, an apparatus for coordinated resource sharing among IoT devices may comprise means for transmitting, from an IoT device to a server, a message to request permission to occupy a shared IoT resource, wherein the IoT device may be a member in an IoT device group that operates on the shared IoT resource, and the apparatus may further comprise means for receiving a message that grants the member IoT device the requested permission to occupy the shared IoT resource from the server (e.g., a floor that blocks other IoT devices from accessing the shared IoT resource while the member IoT device holds the floor). In one embodiment, the message that requests the permission to occupy the shared IoT resource may indicate an amount of the shared IoT resource that the IoT device requests exclusive permission to occupy and the message that grants the member IoT device the requested permission to occupy the shared IoT resource may indicate an amount of the shared IoT resource that the IoT device has been granted permission to occupy. Additionally, in one embodiment, the apparatus may further comprise means for receiving a message that revokes the granted permission to occupy the shared IoT resource from the server, wherein the permission may be revoked due to a timeout period expiring without the member IoT device transmitting a keep-alive message to the server, due to an IoT device with a higher priority than the member IoT device requesting access to the shared IoT resource, and/or based on one or more policies that regulate the member IoT device occupying the shared IoT resource. Furthermore, in one embodiment, the apparatus may comprise means for transmitting a message to the server in order to voluntarily release the granted permission to occupy the shared IoT resource.

According to another exemplary embodiment, the apparatus for coordinated resource sharing among IoT devices may further include means for transmitting a registration request to the server and means for receiving, from the server, a device-specific globally unique identifier (D_GUID) allocated to the member IoT device and/or a group-specific globally unique identifier (G_GUID) allocated to the IoT device group that includes the member IoT device in response to the registration request. As such, the apparatus may include means for transmitting a message to the server to request a resource-specific globally unique identifier (R_GUID) allocated to the shared IoT resource on which the members in the IoT device group associated with the G_GUID operate and means for selecting the R_GUID allocated to the shared IoT resource from a list that the server transmits to the apparatus in response to the message requesting the R_GUID.

According to another exemplary embodiment, an apparatus (e.g., an IoT device that has membership in an IoT device group having one or more members that operate on a shared IoT resource) may comprise at least one processor configured to transmit a message to a server in order to request permission to occupy the shared IoT resource and then receive, from the server, a message that grants the IoT device the requested permission to occupy the shared IoT resource. For example, in one embodiment, the message that the processor receives from the server may grant the requesting IoT device a floor that may permit the IoT device to occupy the shared IoT resource and that may further block other IoT devices from accessing the shared IoT resource until the IoT device currently occupying the shared IoT resource releases the floor or the server revokes the floor granted to the IoT device. As such, the apparatus may be configured to share the IoT resource with other members in the IoT device group and/or members in one or more other IoT device groups in a coordinated manner using machine-to-machine communications. Furthermore, in one embodiment, the apparatus may comprise a memory coupled to the at least one processor (e.g., the memory may store a device-specific globally unique identifier (D_GUID) assigned to the IoT device, a group-specific globally unique identifier (G_GUID) assigned to the IoT device group that includes the IoT device, or other data that may be used to share the IoT resource with the other members in the IoT device group and/or the members in the other IoT device groups in a coordinated manner using machine-to-machine communications).

According to another exemplary embodiment, a computer-readable storage medium may have computer-executable instructions recorded thereon, wherein the computer-executable instructions can be executed on an IoT device that has membership in an IoT device group having one or more members that operate on a shared IoT resource to share the IoT resource in a coordinated manner using machine-to-machine communications. For example, in one embodiment, executing the computer-executable instructions on the IoT device may cause the IoT device to transmit a message to a server in order to request permission to occupy the shared IoT resource and then receive, from the server, a message that grants the member IoT device the requested permission to occupy the shared IoT resource (e.g., the message may grant the requesting IoT device a floor that may permit the IoT device to occupy the shared IoT resource and that may further block other IoT devices from accessing the shared IoT resource until the IoT device currently occupying the shared IoT resource releases the floor or the server revokes the floor granted to the IoT device).

Other objects and advantages associated with the network-based group management and floor control mechanism described herein that may be used to coordinate resource sharing in machine-to-machine communication will be apparent to those skilled in the art based on the accompanying drawings and detailed description.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
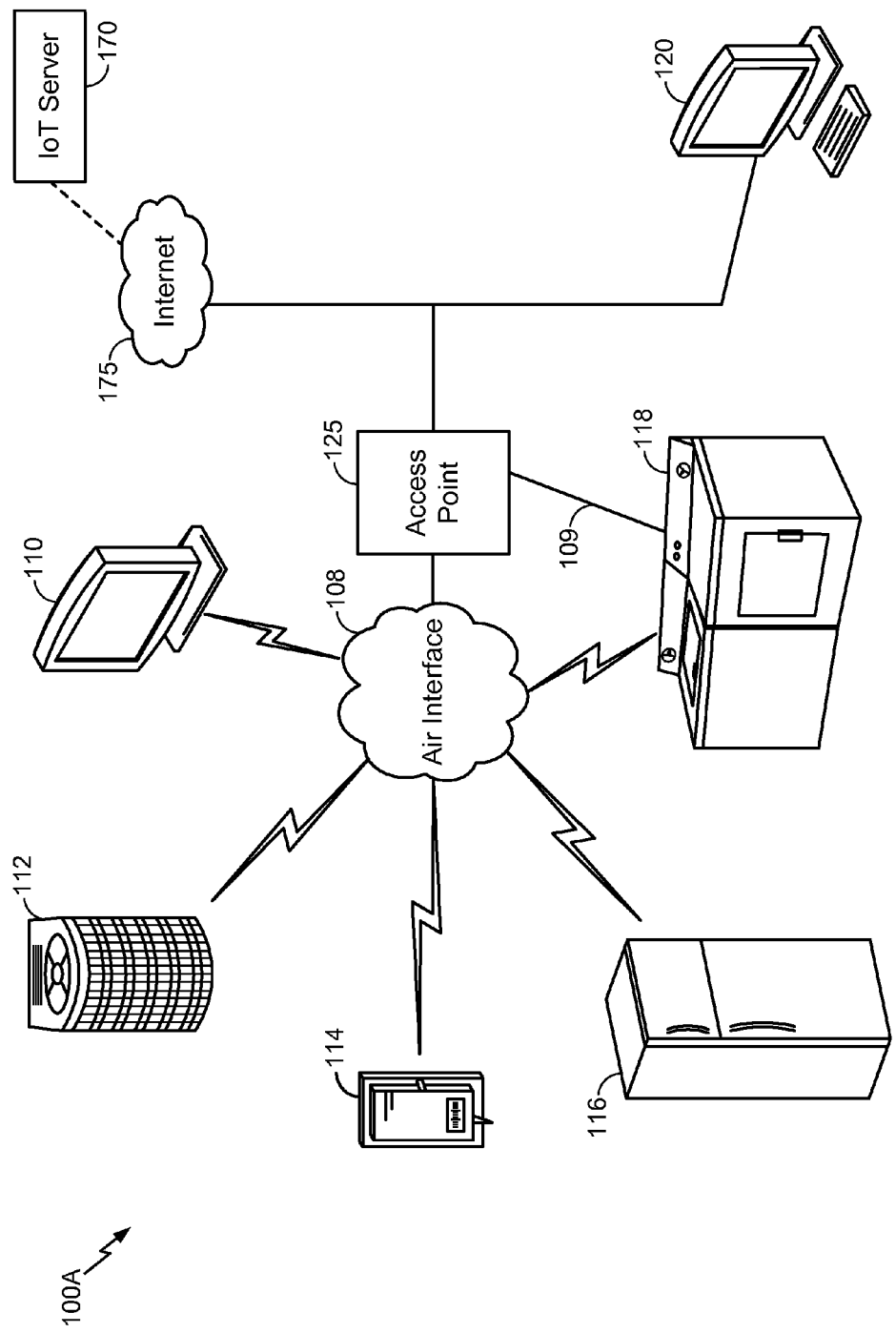
FIG. 1A illustrates a high-level system architecture of a wireless communications system in accordance with an aspect of the disclosure.

Various aspects are disclosed in the following description and related drawings to show specific examples relating to exemplary embodiments of a network-based group management and floor control mechanism that may be used to coordinate resource sharing in machine-to-machine communications. Alternate embodiments will be apparent to those skilled in the pertinent art upon reading this disclosure, and may be constructed and practiced without departing from the scope or spirit of the disclosure. Additionally, well-known elements will not be described in detail or may be omitted so as to not obscure the relevant details of the aspects and embodiments disclosed herein.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments include the discussed feature, advantage or mode of operation.

The terminology used herein describes particular embodiments only and should not be construed to limit any embodiments disclosed herein. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Further, many aspects are described in terms of sequences of actions to be performed by, for example, elements of a computing device. It will be recognized that various actions described herein can be performed by specific circuits (e.g., an application specific integrated circuit (ASIC)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to any object (e.g., an appliance, a sensor, etc.) that has an addressable interface (e.g., an Internet protocol (IP) address, a BLUETOOTH identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the direct wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FIOS, a cable modem, a digital subscriber line (DSL) modem, or the like. The access point 125 may communicate with IoT devices 110-120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-120 may be a peer-to-peer (P2P) network. In such a case, the IoT devices 110-120 can communicate with each other directly over the air interface 108 and/or the direct wired connection 109. Alternatively, or additionally, some or all of IoT devices 110-120 may be configured with a communication interface independent of air interface 108 and direct wired connection 109. For example, if the air interface 108 corresponds to a Wi-Fi interface, one or more of the IoT devices 110-120 may have BLUETOOTH or NFC interfaces for communicating directly with each other or other BLUETOOTH or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
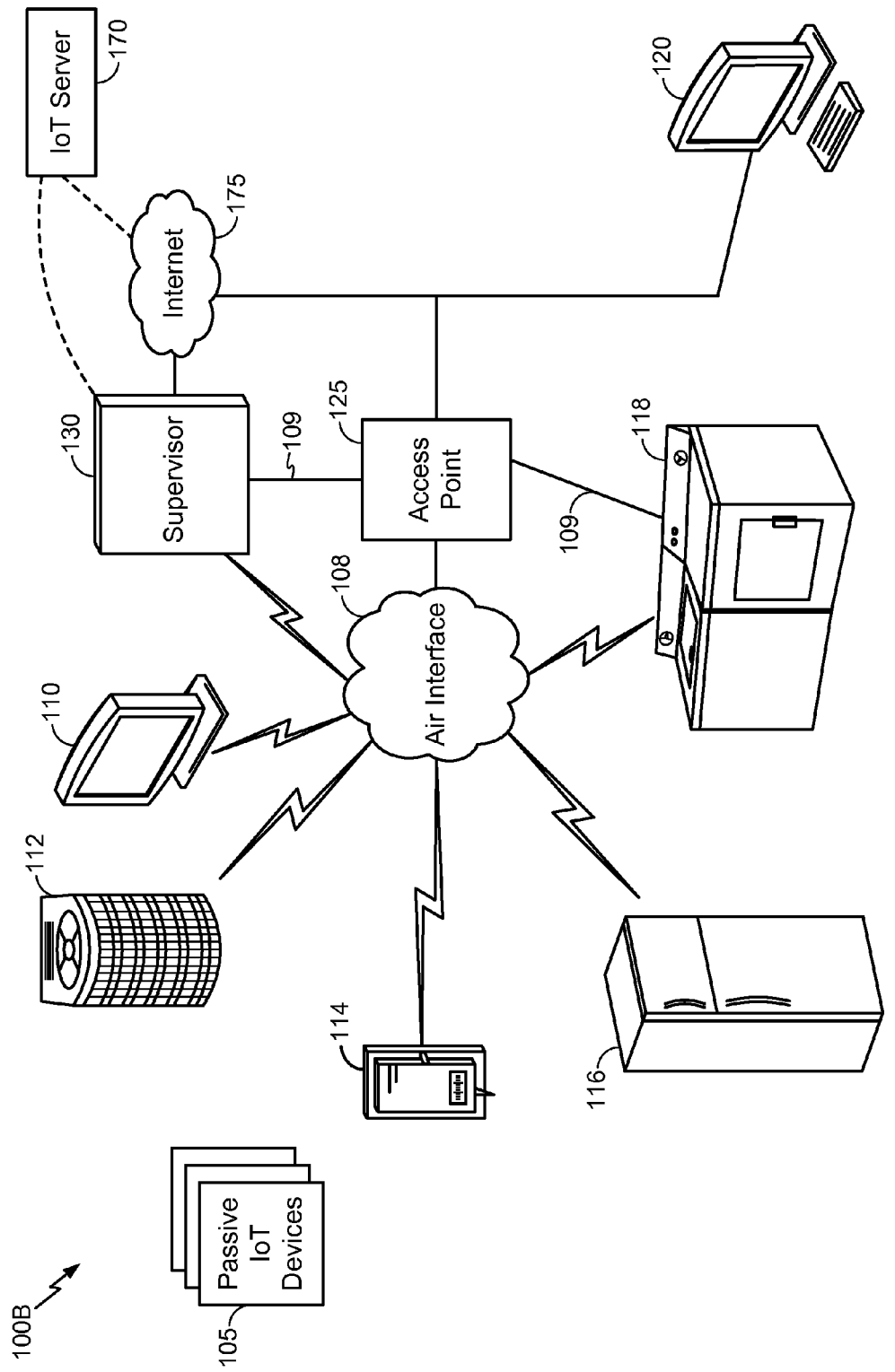
FIG. 1B illustrates a high-level system architecture of a wireless communications system in accordance with another aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130, which may alternatively be referred to as an IoT manager 130 or IoT manager device 130. As such, where the following description uses the term "supervisor device" 130, those skilled in the art will appreciate that any references to an IoT manager, group owner, or similar terminology may refer to the supervisor device 130 or another physical or logical component that provides the same or substantially similar functionality.

In one embodiment, the supervisor device 130 may generally observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-120. The supervisor device 130 may be a standalone device or one of IoT devices 110-120, such as computer 120. The supervisor device 130 may be a physical device or a software application running on a physical device. The supervisor device 130 may include a user interface that can output information relating to the monitored attributes, activities, or other states associated with the IoT devices 110-120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-120) that can be coupled to or otherwise made part of the wireless communications system 100B. In general, the passive IoT devices 105 may include barcoded devices, BLUETOOTH devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communications system 100B and be observed, monitored, controlled, or otherwise managed with the supervisor device 130. Further, passive IoT devices 105 may be coupled to or otherwise made part of the wireless communications system 100A in FIG. 1A and observed, monitored, controlled, or otherwise managed in a substantially similar manner.

Figure 1C:
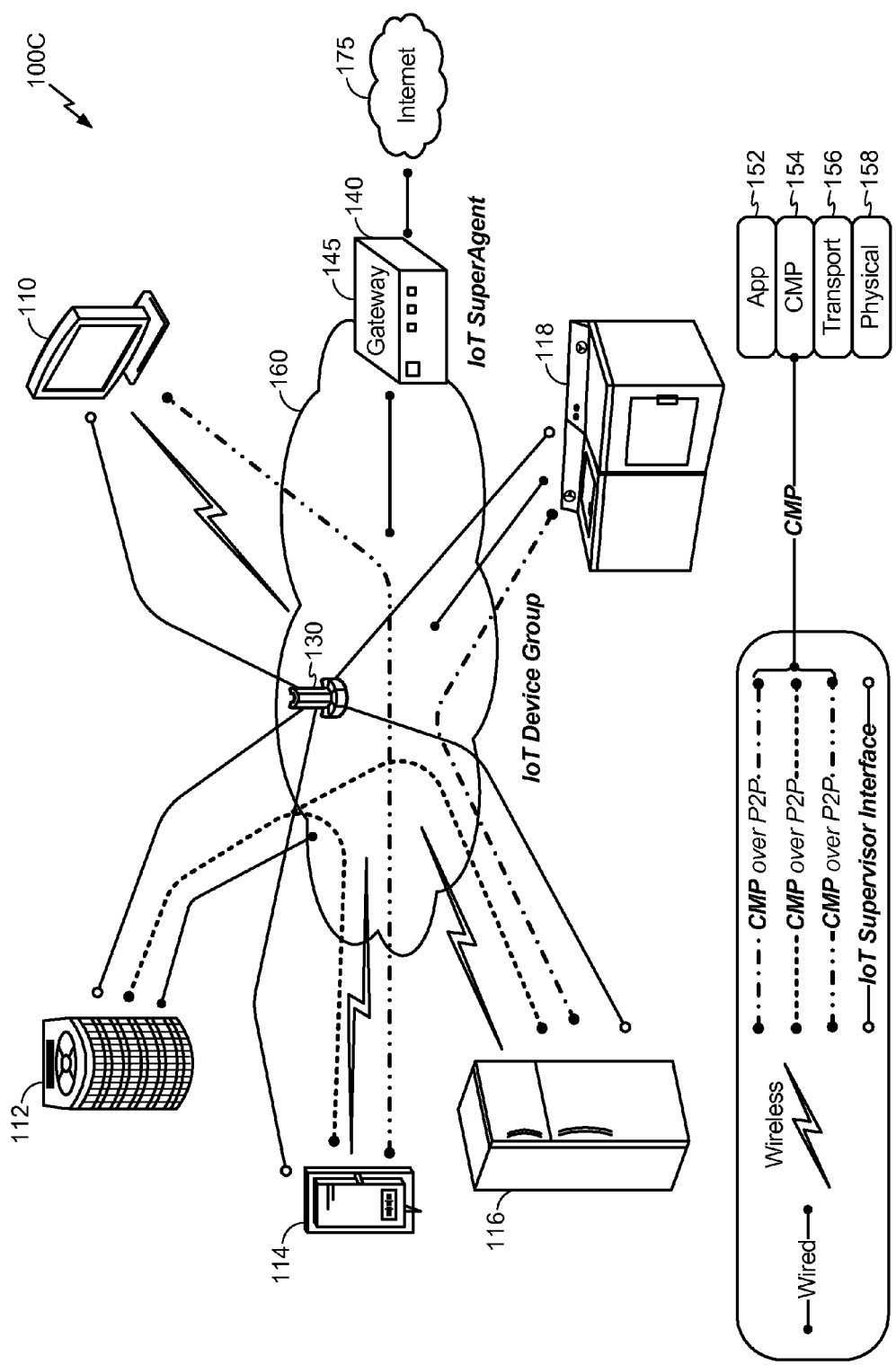
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up an IoT group 160. An IoT device group 160 is a group of locally connected IoT devices, such as the IoT devices connected to a user's home network. Although not shown, multiple IoT device groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device (e.g., a standalone device or an IoT device, such as computer 120 in FIG. 1A). Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
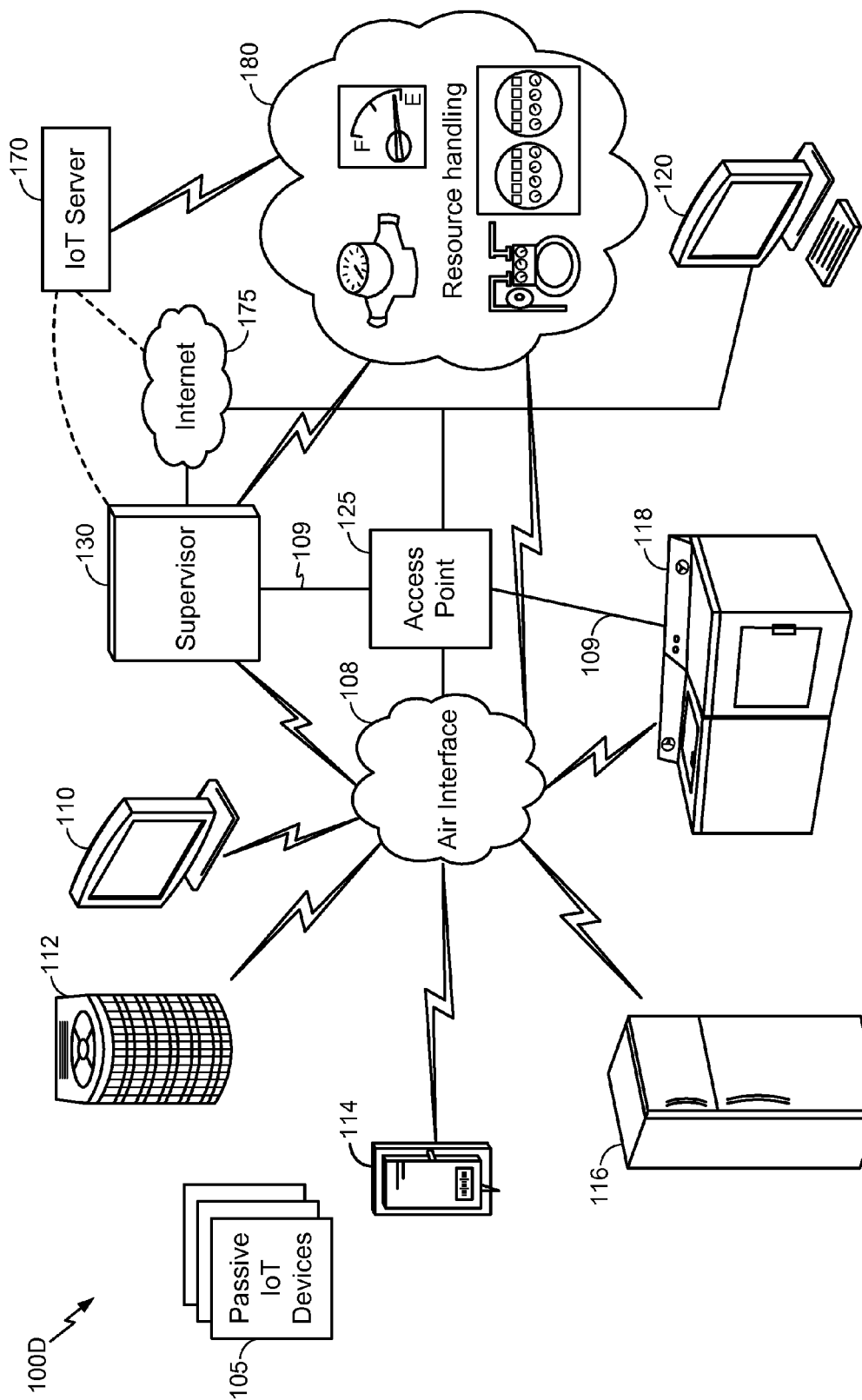
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a BLUETOOTH communication interface to regulate their use of electricity (the resource 180). As another example, IoT devices such as a desktop computer, a telephone, and a tablet computer may communicate over a Wi-Fi communication interface to regulate their access to the Internet 175 (the resource 180). As yet another example, IoT devices such as a stove, a clothes dryer, and a water heater may communicate over a Wi-Fi communication interface to regulate their use of gas. Alternatively, or additionally, each IoT device may be connected to an IoT server, such as IoT server 170, which has logic to regulate their use of the resource 180 based on information received from the IoT devices.

Figure 1E:
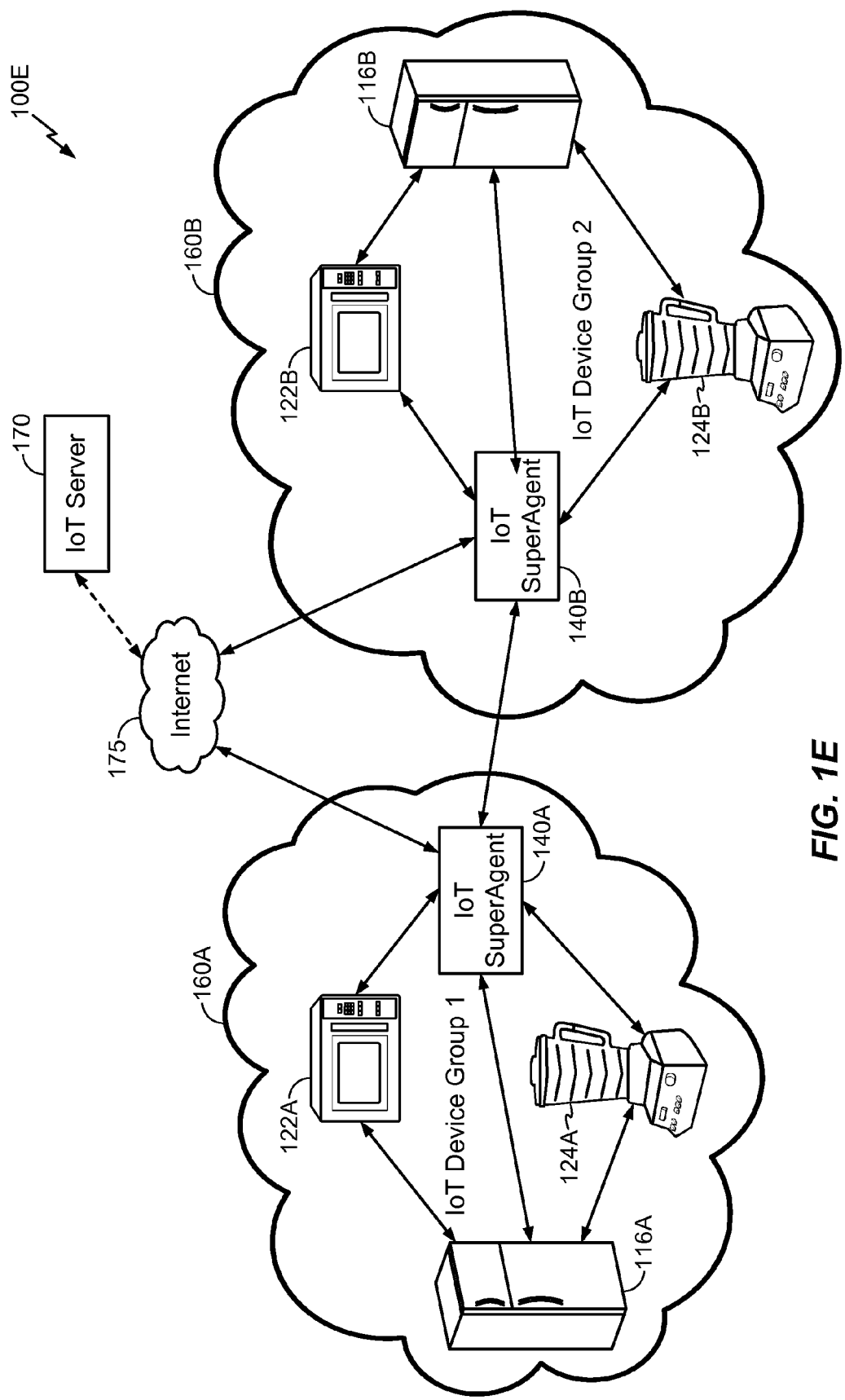
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two IoT device groups 160A and 160B. Multiple IoT device groups may be connected to and/or communicate with each other via an IoT SuperAgent connected to the Internet 175. At a high level, an IoT SuperAgent may manage inter-group communications among IoT device groups. For example, in FIG. 1E, the IoT device group 160A includes IoT devices 116A, 122A, and 124A and an IoT SuperAgent 140A, while IoT device group 160B includes IoT devices 116B, 122B, and 124B and an IoT SuperAgent 140B. As such, the IoT SuperAgents 140A and 140B may connect to the Internet 175 and communicate with each other over the Internet 175 and/or communicate with each other directly to facilitate communication between the IoT device groups 160A and 160B. Furthermore, although FIG. 1E illustrates two IoT device groups 160A and 160B communicating with each other via. IoT SuperAgents 140A and 140B, those skilled in the art will appreciate that any number of IoT device groups may suitably communicate with each other using IoT SuperAgents.

In the exemplary wireless communications systems 100A-100E shown in FIGS. 1A-E, respectively, the IoT server 170 and/or the supervisor device 130 may organize the various IoT devices 110-120 and/or the passive IoT devices 105 into one or more small and relevant IoT device groups 160 and provide a network-based group management and floor control mechanism to support interaction within and among the IoT device groups 160 and usage associated with various resources 180 that may be shared among the IoT devices 110-120 and/or passive IoT devices 105. For example, in one embodiment, the IoT server 170 and/or the supervisor device 130 may provide a distributed network service (e.g., a cloud service) that can represent each IoT device 110-120 and/or passive IoT device 105 in the wireless communications systems 100A-100E with a device-specific globally unique identifier (e.g., a D_GUID), represent each IoT device group 160 with a group-specific globally unique identifier (e.g., a G_GUID), and represent each resource 180 shared in the wireless communications systems 100A-100E with a resource-specific globally unique identifier (e.g., a R_GUID). Accordingly, the D_GUIDs, G_GUIDs, and R_GUIDs may be used to control or otherwise coordinate sharing the resources 180 within an IoT device group 160 and/or between different IoT device groups 160. In particular, the IoT server 170 and/or the supervisor device 130 may define permissions, rules, or other suitable policies that may be used to determine whether a particular device can access a shared resource 180, enable different IoT device groups 160 to interact with each other and access resources 180 in different IoT device groups 160, and regulate the usage associated with the resources 180 (e.g., according to one or N users at a time, according to a maximum duration that a particular client can access a shared resource 180, according to location, time, or other constraints, etc.).

In one embodiment, as will be described in further detail herein, the network-based group management and floor control mechanism disclosed herein may generally have various characteristics that are substantially similar to push-to-talk (PTT) mechanisms used to control telecommunications group communications. For example, in a PTT call, various mechanisms may be used to provision a group, add members to a group, and provide floor control (e.g., each participant who intends to talk presses a PTT button on a device and waits to hear a tone, which may be called a Floor Grant, after which the participant can start to talk). Furthermore, in a PTT call, a server or other management entity may generally have responsibility to grant the floor to participants and ensure that only one participant has the floor at a time. As such, if multiple participants press the PTT button at the same time or close to the same time, the management entity may apply certain configured policies to determine the order in which the contending participants are granted the floor and the maximum duration that each participant can hold the floor. After a time-out period (e.g., a time period that passes without the participant currently holding the floor sending a keep-alive message) or pre-emption to grant the floor to another client (e.g., another participant having a higher ranking or priority), the management entity may send a Floor Revoke tone or other suitable message to the participant that was holding the floor.

Accordingly, in the exemplary wireless communications systems 100A-100E shown in FIGS. 1A-E, respectively, the IoT server 170 and/or the supervisor device 130 may be provisioned with one or more D_GUIDs that represent the various IoT devices 110-120 and/or passive IoT devices 105. Additionally, in response to a new device powering up or otherwise registering with the IoT server 170 and/or the supervisor device 130 after connecting to the IoT network, a new D_GUID may be allocated to the new device to allow the new device to be reached and various properties may be associated with the D_GUID allocated to the new device (e.g., a description, location, type, etc.). In one embodiment, the IoT server 170 and/or the supervisor device 130 may be further provisioned with R_GUIDs that correspond to resources 180 shared within the IoT network and which devices may need to operate on or otherwise interact with. For example, the resources 180 may generally include water, electricity, sunlight, roads, food, or any other suitable resource 180, which may be uniquely identified within a context according to location, household, or other suitable attributes associated with the resources 180. Furthermore, the IoT server 170 and/or the supervisor device 130 may be provisioned with G_GUIDs that represent each IoT device group 160 that works together (e.g., in a household, a lawn sprinkler, water heater, refrigerator, bathtub, etc. may all operate on shared water resources 180). The G_GUIDs may further include various attributes that define a context associated with the IoT device group 160 (e.g., household, location, owner, etc.) and the resources 180 shared therein. In one embodiment, the IoT server 170 and/or supervisor device 130 may further be provisioned with various policies to define hierarchies, rankings, priorities, or other relationships among the various IoT devices 110-120 and passive IoT devices 105 in addition to the IoT device groups 160 to which they are allocated, the resources 180 shared therein, and any pre-emption policies to control contending access to the resources 180.

In one embodiment, in response to having suitably provisioned the IoT server 170 and/or the supervisor device 130 with the various D_GUIDs, G_GUIDs, R_GUIDs, and policies, the IoT server 170 and/or the supervisor device 130 may then discover the various IoT device groups 160 and the various resources 180 shared thereby. For example, in one embodiment, an R_GUID may be statically provisioned to or otherwise associated with one or more D_GUIDs that correspond to devices that require access to a certain shared resource 180. In another example, a device that wishes to access a certain shared resource 180 may query the IoT server 170 and/or the supervisor device 130 based on a location, description, or other suitable attributes associated therewith, and the device may then select an appropriate resource 180 from a list that the IoT server 170 and/or the supervisor device 130 returns to the device. Further still, in one embodiment, one or more resources 180 may be tagged with an RFID, bar code, or other suitable data that the IoT devices 110-120 can read in order to dynamically discover the resources 180. Furthermore, in one embodiment, the IoT server 170 and/or the supervisor device 130 may employ a query mechanism to discover the IoT device groups 160 based on context or information input to a suitable user interface (e.g., owners associated with two IoT device groups 160 may exchange G_GUIDs to initiate interaction between the two IoT device groups 160). In another example, based on the permissions, rules, or other policies provisioned to the IoT server 170 and/or the supervisor device 130, two or more IoT device groups 160 can be permanently or temporarily merged to enable the two or more IoT device groups 160 to use the resources shared within each IoT device group.

In one embodiment, in response to having suitably discovered the various IoT device groups 160 and the various resources 180 shared thereby, the IoT server 170 and/or the supervisor device 130 may then coordinate shared access to the resources 180 based on machine-to-machine communications using the network-based group management and floor control mechanism. For example, in a substantially similar manner to the PTT mechanisms described above, a device that needs to use a shared resource 180 may send a Floor Request message to the IoT server 170 and/or the supervisor device 130 and wait to receive a Floor Grant message acknowledging the Floor Request message from the IoT server 170 and/or the supervisor device 130. In one embodiment, if the device that sent the Floor Request message does not receive the Floor Grant message or other message from the IoT server 170 and/or the supervisor device 130 that acknowledges the Floor Request message (e.g., a message denying the Floor Request), the device may then retransmit the Floor Request message. In one embodiment, the IoT server 170 and/or the supervisor device 130 may generally determine whether or not to grant the floor, which may provide the requesting device with the exclusive right to use, access, consume, or otherwise occupy the resource 180 (or a portion of the resource 180), based on the one or more policies that were previously provisioned to the IoT server 170 and/or the supervisor device 130.

Accordingly, the floor may generally grant a requesting IoT device permission to use the resource 180 in that the IoT device holding the floor may exclusively use, access, consume, or otherwise utilize the resource 180 or a portion thereof, or alternatively prevent or otherwise block other devices from using the resource 180 or a portion thereof. In other words, the floor may grant a requesting IoT device permission to "occupy" the resource 180 or a certain portion of the resource 180, which may involve consuming the resource 180, using the resource 180, accessing the resource 180, blocking usage or consumption associated with the resource 180, or any suitable combination thereof (e.g., the resource 180 may be a garage door, but a sensor device that detects a child or other person underneath the garage door may automatically obtain the floor to the garage door resource 180 to occupy the garage door resource 180 and thereby prevent another device from closing the garage door on the person standing underneath).

Additionally, in one embodiment, the IoT server 170 and/or the supervisor device 130 may maintain data and statistics that relate to each resource 180 shared or otherwise used within a particular IoT device group 160, wherein the provisioned permissions, rules, and other policies may be used to regulate whether to grant the floor to a certain requesting device. Moreover, in one embodiment, the various devices may query the IoT server 170 and/or the supervisor device 130 to determine an available quota associated with a particular resource 180 (e.g., an amount of the resource 180 that can be consumed or occupied while a particular device holds the floor). For example, if a hot water resource 180 is running low, a user requesting the floor to occupy the hot water resource 180 may be notified to not take a shower or the availability associated with the hot water resource 180 may be used to control whether or not a request to obtain the floor to occupy the hot water resource 180 will be granted or denied.

Accordingly, in response to the IoT server 170 and/or the supervisor device 130 granting a particular Floor Request, the requesting device may be granted the exclusive right to use, access, consume, or otherwise occupy the resource 180 (or a portion thereof) and the IoT server 170 and/or the supervisor device 130 may start a timer to regulate the duration associated with the floor. For example, in one embodiment, any particular device that has been granted the floor may be required to periodically exchange a keep-alive message with the IoT server 170 and/or the supervisor device 130 in order to ensure that the connection with the device holding the floor has not been lost. As such, the IoT server 170 and/or the supervisor device 130 may generally restart the timer to renew the floor that the device currently holds to the resource 180 in response to receiving a keep-alive message from the device prior to the timer expiring. Otherwise, if the IoT server 170 and/or the supervisor device 130 does not receive a keep-alive message from the device that currently has the floor to the resource 180, the IoT server 170 and/or the supervisor device 130 may assume that the device has lost connectivity and then revoke the floor granted thereto. Alternatively, if the device that currently has the floor no longer needs to use or otherwise occupy the shared resource 180, the device may send a Floor Release message the IoT server 170 and/or the supervisor device 130, which may then make the resource 180 available to other devices. For example, the floor may then be granted to another device that requested the floor while the resource 180 was already occupied. In another example, if no other devices requested the floor while the resource 180 was occupied, the IoT server 170 and/or the supervisor device 130 may broadcast a message throughout the IoT network to indicate that the resource 180 has become available. In another example, if another device requests the floor while another device may be occupying the resource 180, the IoT server 170 and/or the supervisor device 130 may determine whether to pre-empt the device currently holding the floor based on the hierarchies, rankings, or other priorities associated with the IoT device groups 160, in which case the IoT server 170 and/or the supervisor device 130 may similarly revoke the floor granted to the device currently occupying the resource 180. For example, the pre-emption feature may allow another higher ranking or higher priority requesting device to terminate the floor granted to another device (e.g., if a clothes washer is running and currently occupying a water resource 180 and someone wants to use the shower, the shower may pre-empt the floor granted to the washer).

Referring back to FIG. 1C, in which the wireless communications system 100C shown therein includes one IoT device group 160, exemplary use cases in which the network-based group management and floor control mechanism disclosed herein may be applied to one IoT device group 160 will now be described. For example, in the PTT analogy mentioned above, the IoT device group 160 may include various client handsets, each client handset may correspond to an IoT device, and the shared resource in a PTT call may be air-time, wherein a quality assurance service (QAS) may regulate the shared air-time resource via Floor Grant messages.

In another example, the IoT device group 160 may include multiple robotic devices that work autonomously on an industrial workshop floor and have to travel through narrow doorways with dimensions that only permit one robotic device at a time. As such, the doorways can be considered mutually exclusive shared resources 180, and the robotic devices may read RFID tags on the doorways to discover R_GUIDs associated therewith. Each time that a robotic device needs to pass through a doorway, the configured policies may require the robotic device to obtain the floor on the R_GUID associated with the doorway and subsequently release the floor after passing though the doorway, thereby guaranteeing that no two robotic devices will run into each other in the doorway.

In another more aggressive exemplary use case that may apply to a single IoT device group 160, the network-based group management and floor control mechanism may be used to provide air traffic control. In particular, a runway can be identified as a mutually exclusive resource 180, and the configured policies may require each pilot to request the floor on the runway resource 180 prior to landing or takeoff. As such, the floor will be granted to provide exclusive access to use or otherwise occupy the runway resource 180 based on provisioned rules that consider airline priorities or other suitable factors.

In still another exemplary use case, a single lane road in which two or more connected cars travelling in opposite directions may form an IoT device group 160 that share the road resource 180, which may be identified from an active RFID on each end of the narrow road. The cars may then reading the RFID tag to discover the R_GUID associated with the roadway and request the floor on that roadway resource 180, whereby the car that receives the floor grant may be permitted to pass through the roadway resource 180 one at a time (and subsequently release the floor to allow other cars to receive the floor grant and pass through the roadway resource 180).

Referring now to FIG. 1E, in which the wireless communications system 100E shown therein includes two IoT device groups 160, exemplary use cases in which the network-based group management and floor control mechanism disclosed herein may be applied to multiple IoT device groups 160 will now be described. For example, various home appliances in a household that use a shared water resource 180 may form an IoT device group 160, wherein the IoT server 170 and/or the supervisor device 130 may regulate usage associated with the water resource 180 (e.g., permissions, rules, or other suitable policies may be defined to limit granting the water resource 180 to a maximum of three appliances at a time and allow each appliance to use no more than ten gallons per hour). If one or more guests subsequently arrive at the household, resulting in changes to the need to use the water resource 180 (e.g., additional laundry, kitchen usage, car wash usage, etc.), the guests may merge the appliances in the water IoT device group 160 with a household visitors IoT group 160, wherein the water IoT device group 160 and the household visitors IoT group 160 can then be allocated aggregated quotas to use or otherwise occupy the shared water resource 180 from the two IoT device groups 160.

Figure 2A:
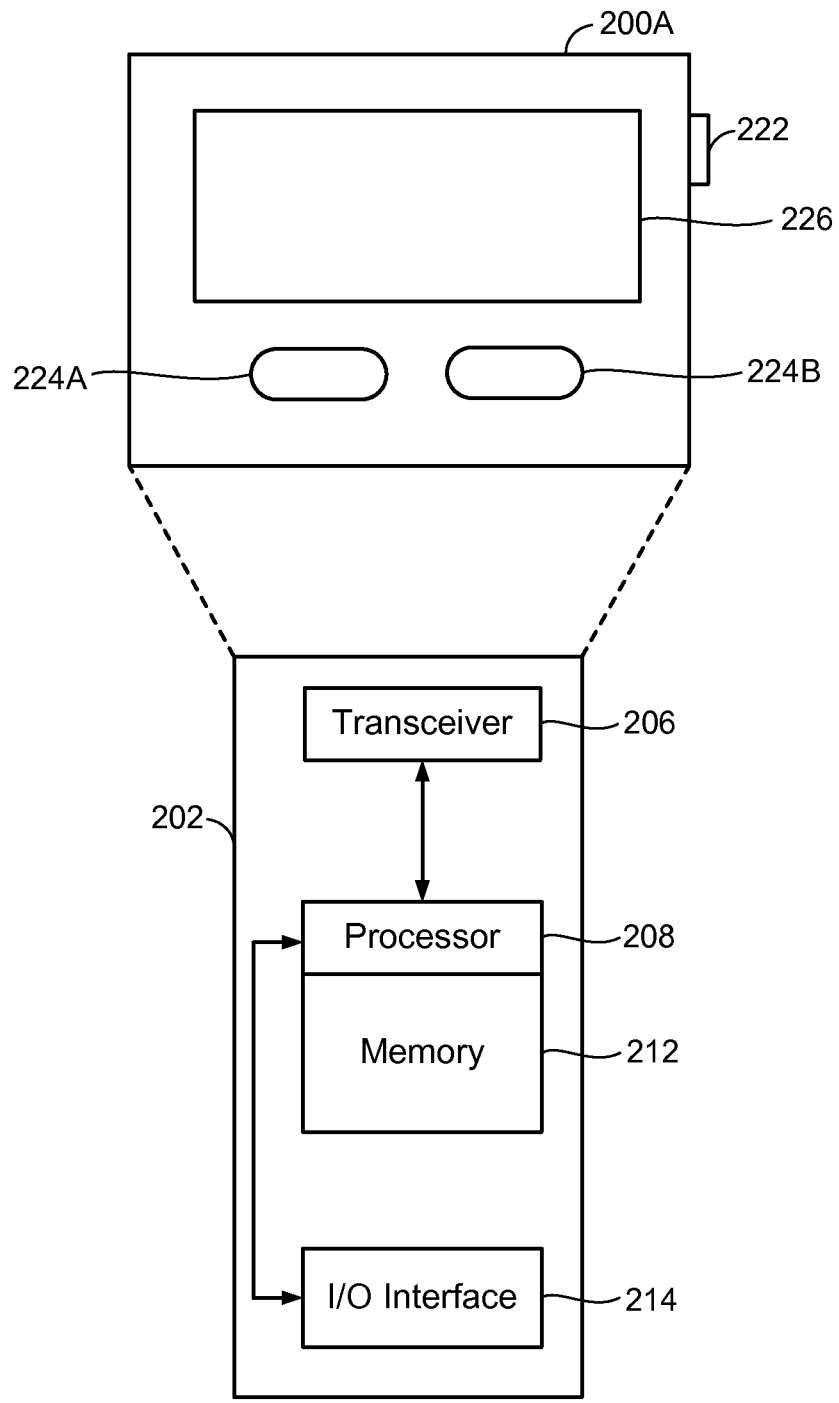

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and/or a wired interface. The platform 202 can also independently execute locally stored applications. The platform 202 can include one or more transceivers 206 configured for wired and/or wireless communication (e.g., a Wi-Fi transceiver, a BLUETOOTH transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
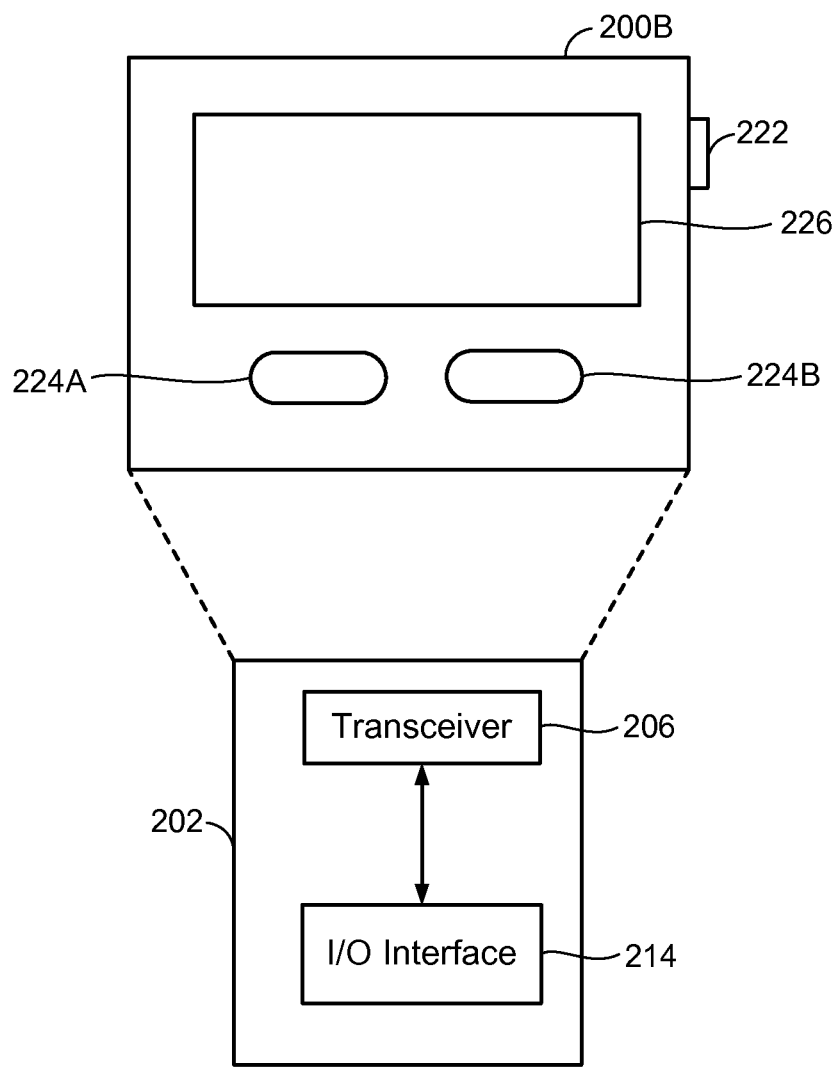
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, BLUETOOTH interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
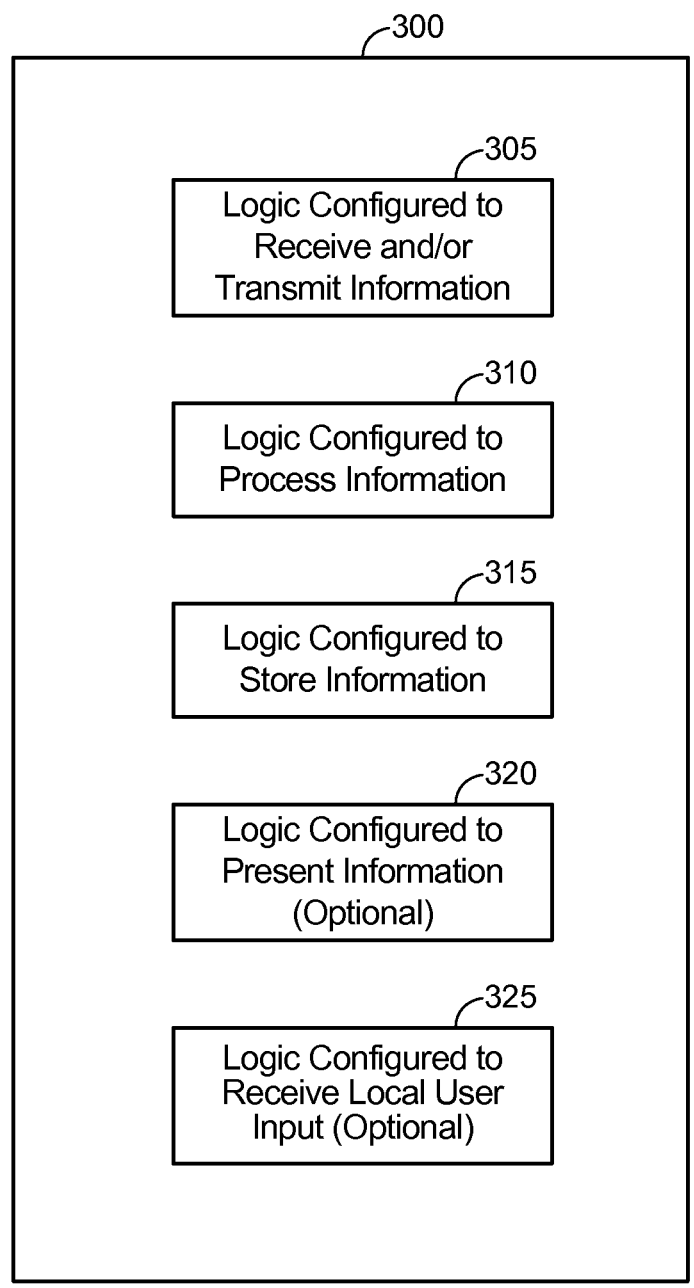
FIG. 3 illustrates a communication device that includes logic configured to perform functionality in accordance with an aspect of the disclosure.

FIG. 3 illustrates a communication device 300 that includes logic configured to perform functionality. The communication device 300 can correspond to any of the above-noted communication devices, including but not limited to IoT devices 110-120, IoT device 200A, any components coupled to the Internet 175 (e.g., the IoT server 170), and so on. Thus, communication device 300 can correspond to any electronic device that is configured to communicate with (or facilitate communication with) one or more other entities over the wireless communications systems 100A-B of FIGS. 1A-B.

Referring to FIG. 3, the communication device 300 includes logic configured to receive and/or transmit information 305. In an example, if the communication device 300 corresponds to a wireless communications device (e.g., IoT device 200A and/or passive IoT device 200B), the logic configured to receive and/or transmit information 305 can include a wireless communications interface (e.g., BLUETOOTH, Wi-Fi, WI-FI DIRECT, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 305 can correspond to a wired communications interface (e.g., a serial connection, a USB or Firewire connection, an Ethernet connection through which the Internet 175 can be accessed, etc.). Thus, if the communication device 300 corresponds to some type of network-based server (e.g., the application 170), the logic configured to receive and/or transmit information 305 can correspond to an Ethernet card, in an example, that connects the network-based server to other communication entities via an Ethernet protocol. In a further example, the logic configured to receive and/or transmit information 305 can include sensory or measurement hardware by which the communication device 300 can monitor its local environment (e.g., an accelerometer, a temperature sensor, a light sensor, an antenna for monitoring local RF signals, etc.). The logic configured to receive and/or transmit information 305 can also include software that, when executed, permits the associated hardware of the logic configured to receive and/or transmit information 305 to perform its reception and/or transmission function(s). However, the logic configured to receive and/or transmit information 305 does not correspond to software alone, and the logic configured to receive and/or transmit information 305 relies at least in part upon hardware to achieve its functionality.

Referring to FIG. 3, the communication device 300 further includes logic configured to process information 310. In an example, the logic configured to process information 310 can include at least a processor. Example implementations of the type of processing that can be performed by the logic configured to process information 310 includes but is not limited to performing determinations, establishing connections, making selections between different information options, performing evaluations related to data, interacting with sensors coupled to the communication device 300 to perform measurement operations, converting information from one format to another (e.g., between different protocols such as .wmv to .avi, etc.), and so on. For example, the processor included in the logic configured to process information 310 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 310 can also include software that, when executed, permits the associated hardware of the logic configured to process information 310 to perform its processing function(s). However, the logic configured to process information 310 does not correspond to software alone, and the logic configured to process information 310 relies at least in part upon hardware to achieve its functionality.

Referring to FIG. 3, the communication device 300 further includes logic configured to store information 315. In an example, the logic configured to store information 315 can include at least a non-transitory memory and associated hardware (e.g., a memory controller, etc.). For example, the non-transitory memory included in the logic configured to store information 315 can correspond to RAM, flash memory, ROM, erasable programmable ROM (EPROM), EEPROM, registers, hard disk, a removable disk, a CD-ROM, or any other form of storage medium known in the art. The logic configured to store information 315 can also include software that, when executed, permits the associated hardware of the logic configured to store information 315 to perform its storage function(s). However, the logic configured to store information 315 does not correspond to software alone, and the logic configured to store information 315 relies at least in part upon hardware to achieve its functionality.

Referring to FIG. 3, the communication device 300 further optionally includes logic configured to present information 320. In an example, the logic configured to present information 320 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 300. For example, if the communication device 300 corresponds to the IoT device 200A as shown in FIG. 2A and/or the passive IoT device 200B as shown in FIG. 2B, the logic configured to present information 320 can include the display 226. In a further example, the logic configured to present information 320 can be omitted for certain communication devices, such as network communication devices that do not have a local user (e.g., network switches or routers, remote servers, etc.). The logic configured to present information 320 can also include software that, when executed, permits the associated hardware of the logic configured to present information 320 to perform its presentation function(s). However, the logic configured to present information 320 does not correspond to software alone, and the logic configured to present information 320 relies at least in part upon hardware to achieve its functionality.

Referring to FIG. 3, the communication device 300 further optionally includes logic configured to receive local user input 325. In an example, the logic configured to receive local user input 325 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 300. For example, if the communication device 300 corresponds to the IoT device 200A as shown in FIG. 2A and/or the passive IoT device 200B as shown in FIG. 2B, the logic configured to receive local user input 325 can include the buttons 222, 224A, and 224B, the display 226 (if a touchscreen), etc. In a further example, the logic configured to receive local user input 325 can be omitted for certain communication devices, such as network communication devices that do not have a local user (e.g., network switches or routers, remote servers, etc.). The logic configured to receive local user input 325 can also include software that, when executed, permits the associated hardware of the logic configured to receive local user input 325 to perform its input reception function(s). However, the logic configured to receive local user input 325 does not correspond to software alone, and the logic configured to receive local user input 325 relies at least in part upon hardware to achieve its functionality.

Referring to FIG. 3, while the configured logics of 305 through 325 are shown as separate or distinct blocks in FIG. 3, it will be appreciated that the hardware and/or software by which the respective configured logic performs its functionality can overlap in part. For example, any software used to facilitate the functionality of the configured logics of 305 through 325 can be stored in the non-transitory memory associated with the logic configured to store information 315, such that the configured logics of 305 through 325 each performs their functionality (i.e., in this case, software execution) based in part upon the operation of software stored by the logic configured to store information 315. Likewise, hardware that is directly associated with one of the configured logics can be borrowed or used by other configured logics from time to time. For example, the processor of the logic configured to process information 310 can format data into an appropriate format before being transmitted by the logic configured to receive and/or transmit information 305, such that the logic configured to receive and/or transmit information 305 performs its functionality (i.e., in this case, transmission of data) based in part upon the operation of hardware (i.e., the processor) associated with the logic configured to process information 310.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 4:
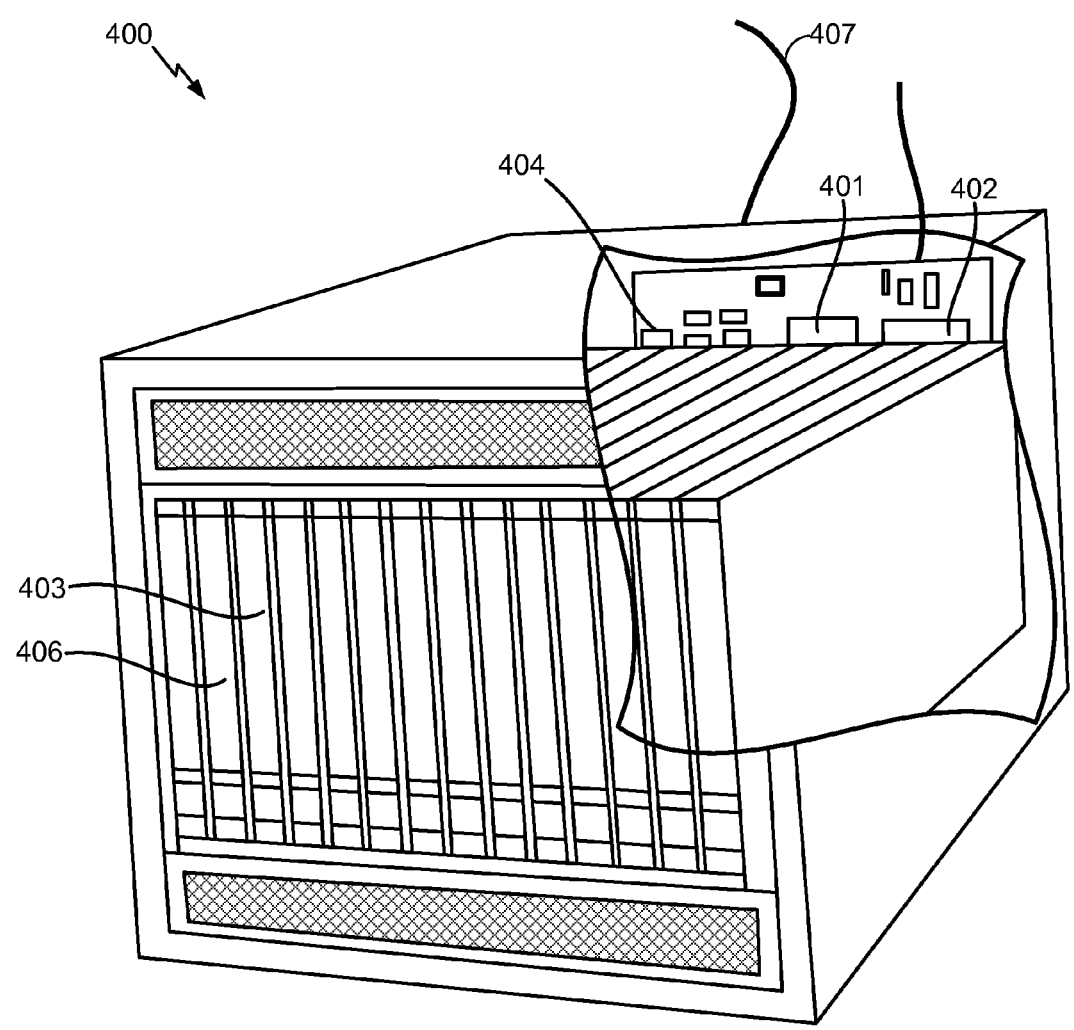
FIG. 4 illustrates an exemplary server according to various aspects of the disclosure.

The various embodiments may be implemented on any of a variety of commercially available server devices, such as server 400 illustrated in FIG. 4. In an example, the server 400 may correspond to one example configuration of the IoT server 170 described above. In FIG. 4, the server 400 includes a processor 401 coupled to volatile memory 402 and a large capacity nonvolatile memory, such as a disk drive 403. The server 400 may also include a floppy disc drive, compact disc (CD) or DVD disc drive 406 coupled to the processor 401. The server 400 may also include network access ports 404 coupled to the processor 401 for establishing data connections with a network 407, such as a local area network coupled to other broadcast system computers and servers or to the Internet. In context with FIG. 3, it will be appreciated that the server 400 of FIG. 4 illustrates one example implementation of the communication device 300, whereby the logic configured to transmit and/or receive information 305 corresponds to the network access ports 404 used by the server 400 to communicate with the network 407, the logic configured to process information 310 corresponds to the processor 401, and the logic configuration to store information 315 corresponds to any combination of the volatile memory 402, the disk drive 403 and/or the disc drive 406. The optional logic configured to present information 320 and the optional logic configured to receive local user input 325 are not shown explicitly in FIG. 4 and may or may not be included therein. Thus, FIG. 4 helps to demonstrate that the communication device 300 may be implemented as a server, in addition to an IoT device implementation as in FIG. 2A.

IP based technologies and services have become more mature, driving down the cost and increasing availability of IP. This has allowed Internet connectivity to be added to more and more types of everyday electronic objects. The IoT is based on the idea that everyday electronic objects, not just computers and computer networks, can be readable, recognizable, locatable, addressable, and controllable via the Internet.

In general, with the development and increasing prevalence of the IoT, numerous heterogeneous IoT devices that perform different activities and need to interact with one another in many different ways may be in use in homes, workplaces, cars, shopping centers, and various other locations. As such, due to the potentially large number of heterogeneous IoT devices that may be in use, direct communication among individual IoT devices may be inefficient or insufficient to meet user demands and needs. Accordingly, as will be described in further detail below with reference to FIG. 5, various IoT devices may be organized or otherwise formed into groups to enable different IoT devices to work together more efficiently, optimize communication among different IoT devices, and improve effectiveness and overall user experience.

More particularly, in one embodiment, an exemplary method 500 for forming IoT device groups and enabling communication among IoT device groups may include defining various criteria to form the IoT device groups at block 510, wherein the IoT group criteria defined at block 510 may include appropriate criteria to rank members within a particular IoT group, provisioning mechanisms to allocate IoT devices to certain groups, or other suitable group criteria. For example, in one embodiment, the criteria defined at block 510 may define certain activities or contexts that may be the same, substantially similar, or otherwise related among various different IoT devices (e.g., dishwashers, showers, bathtubs, hot water heaters, washing machines, etc. may all utilize hot water, while televisions, Blu-ray players, DVRs, etc. may all be considered media devices, etc.). Furthermore, in one embodiment, the criteria defined at block 510 may define certain dynamic contexts that may be limited in scope, duration, location, or otherwise (e.g., dishwashers, showers, bathtubs, hot water heaters, washing machines, etc. may all utilize hot water but only actually use hot water at certain times).

In one embodiment, in response to suitably defining the IoT device grouping criteria at block 510, one or more pre-defined IoT device groups may be formed based on static criteria at block 520. For example, in one embodiment, one or more IoT devices that perform the same or substantially similar activities, utilize the same or substantially similar resources, or otherwise have certain permanently common characteristics may be persistently allocated to the pre-defined IoT device groups at block 520 to enable communication among all IoT devices that have the permanently common characteristics. Further, in one embodiment, certain IoT devices may be dynamically allocated to one or more ad-hoc IoT device groups at block 530 to the extent that such IoT devices may perform the same or substantially similar activities in certain limited contexts, utilize the same or substantially similar resources in certain limited contexts, or otherwise have certain temporarily common characteristics. Accordingly, a determination may be made as to whether one or more dynamic IoT device group formation criteria have been satisfied, wherein one or more IoT devices may be dynamically allocated to one or more ad-hoc IoT device groups at block 530 in response to determining that the dynamic IoT device group formation criteria have been satisfied. For example, the ad-hoc IoT device groups formed at block 530 may be defined to last a certain time, encompass IoT devices in certain locations, or encompass IoT devices that otherwise share a context based on current status (e.g., during owner presence, IoT devices using certain resources such as all the IoT devices using hot water may be automatically made part of a hot water group, IoT devices having a particular operating state such as all IoT devices that are currently active may be made part of a busy group, etc.). Accordingly, the members within the various pre-defined IoT device groups and/or ad-hoc IoT device groups may generally be allocated based on suitable static and/or dynamic criteria, respectively. Among other advantages, grouping IoT devices into the pre-defined and ad-hoc groups can enable a particular IoT device to send a message to a particular pre-defined or ad-hoc group without having to know the members within the group. For example, in one embodiment, an energy meter IoT device can send a command to an ad-hoc "idle" IoT device group to enter an offline state in response to receiving an appropriate signal from a power grid.

In one embodiment, in response to suitably forming the pre-defined IoT device groups at block 520 and/or any ad-hoc IoT device groups that satisfy the dynamic group formation criteria at block 530, one or more hierarchies associated with the formed IoT device groups may be defined at block 540. For example, in one embodiment, the hierarchies defined at block 540 may designate a particular IoT device in each group as the owner or manager associated therewith. In another example, the hierarchies defined at block 540 may rank the IoT devices in each group (e.g., according to the manner in which the various grouped IoT devices interact with one another, perform common or otherwise similar activities, have dependent relationships, etc.).

In one embodiment, the hierarchies defined at block 540 may then be used to enable communication among the various pre-defined and/or ad-hoc IoT device groups at block 550. For example, in one embodiment, block 550 may enable communication in a manner whereby only the group owners or managers associated with multiple IoT device groups (or certain IoT device groups) communicate with one another. In this manner, the IoT device group owners or managers may relay messages to and from member IoT devices such that the only inter-group communication occurs between the group owners or managers (e.g., an originator IoT device can send a message to an address associated with a target IoT group, wherein based on rankings or other hierarchies within the target IoT group, a ranking manager, owner, server, or other member therein can send the message to other members based on rankings or other hierarchical criteria). In another example, hierarchical group communication may be enabled at block 550, wherein certain messages that are directed to certain IoT devices among all the IoT devices in a particular group may be targeted to one or more ranking members in the group (e.g., a message to record a particular television program may be directed to a master DVR in a multi-room DVR system where certain set-top boxes in satellite rooms stream content recorded on the master DVR). In another example, all IoT devices in a home that are currently using hot water may be dynamically allocated to an ad-hoc hot water IoT device group, whereby any IoT device that wants to communicate with the IoT devices in the ad-hoc hot water group can address the group (e.g., via a message to the group owner or manager) without needing to know or otherwise identify the individual IoT member devices. Furthermore, in one embodiment, the IoT group communication enabled at block 550 may comprise peer-to-peer communication. In particular, the peer-to-peer IoT group communication may enable an originating IoT device to ping a manager IoT device within a target IoT group to find the members associated with the target IoT group. As such, the originating IoT device may then communicate with the various members in the target IoT group peer-to-peer.

In one embodiment, in response to suitably forming the IoT device groups, defining the hierarchies associated with the IoT device groups, and enabling communication among the IoT device groups, the method 500 may return to blocks 520 and 530 to manage the IoT device groups. For example, certain IoT member devices may be dynamically allocated or removed from one or more ad-hoc IoT device groups at block 530 in response to changes in status associated therewith. In another example, a certain IoT device that an owner no longer uses may be removed from any pre-defined IoT device group or ad-hoc IoT device group in which the IoT device was a member at block 520. Furthermore, in one embodiment, a new IoT device may be added to one or more pre-defined IoT device groups upon initialization at block 520 and/or ad-hoc IoT device groups at block 530 based on a current status and/or subsequent changes in status. For example, a new refrigerator IoT device may join a pre-defined IoT group that includes every IoT device in a network upon initialization and join a closed refrigerator IoT group in a neighborhood that can send consolidated orders to a grocery store. In another example, a local neighborhood may include a closed sprinkler controller IoT device group that can share weather information and coordinate operational times (e.g., the group owner or another suitable ranking member in the sprinkler controller IoT device group may subscribe to weather forecasts and inform all other members in the group about upcoming weather forecasts to coordinate when and/or how long the sprinklers should enter an operational state). In still another example, a bathtub IoT device may notify an ad-hoc hot water group that water will be required for a certain time period (e.g., the next 15 minutes or until the bathtub has filled), or the bathtub may appropriately join the ad-hoc hot water group for the time period during which hot water will be required.

Figure 5:
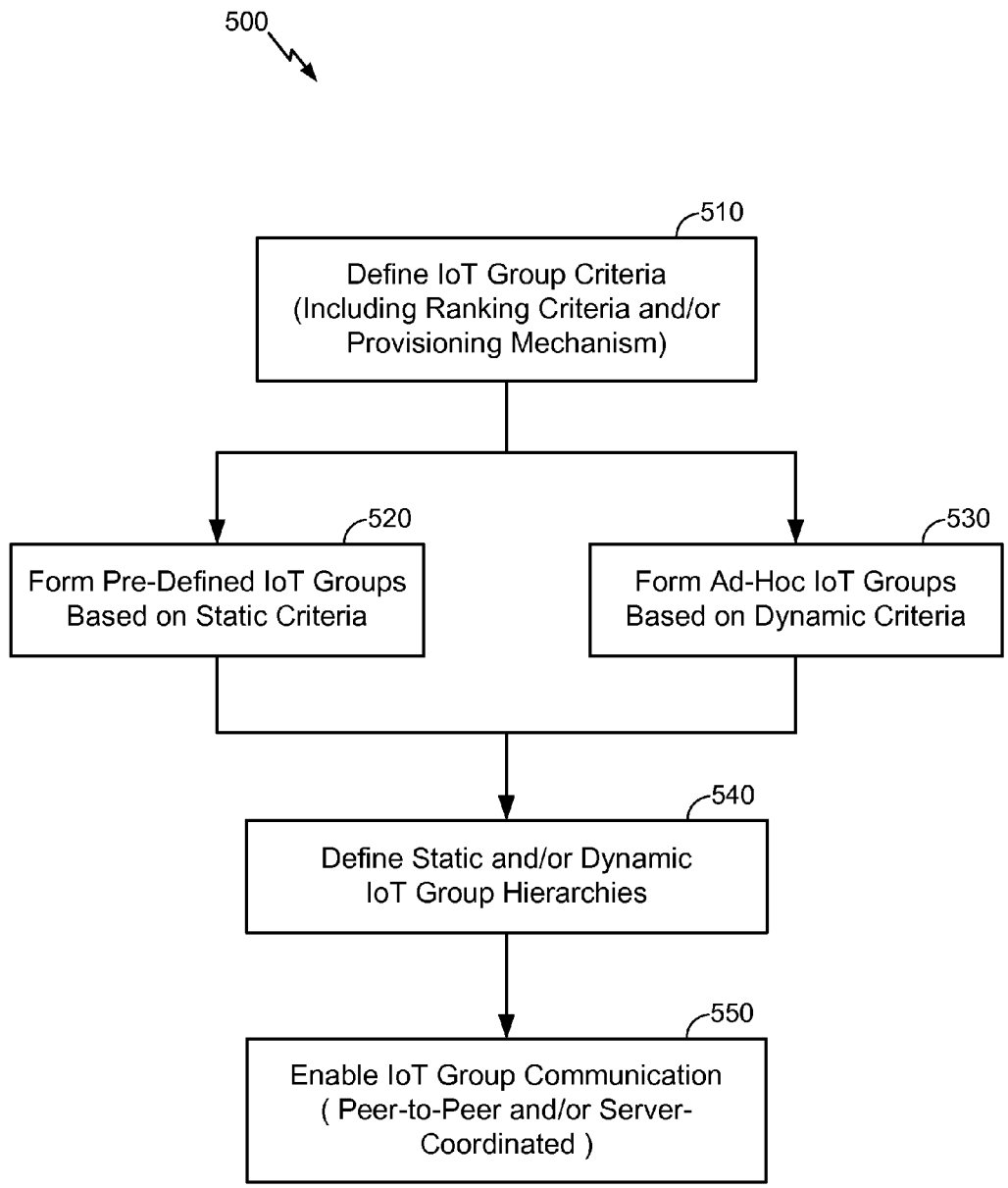
FIG. 5 illustrates an exemplary method for forming IoT device groups and enabling communication among IoT device groups according to various aspects of the disclosure.

Accordingly, the method 500 shown in FIG. 5 and described in further detail above may generally be used on a server or other suitable management entity to provision and discover IoT devices, IoT device groups, and resources shared among and between the IoT devices and/or IoT device groups. More particularly, the method 500 may be performed to organize various IoT devices and/or passive IoT devices into one or more small and relevant IoT device groups, wherein the network-based group management and floor control mechanism disclosed herein may then be used to support interaction within and among the IoT device groups and usage associated with various resources that may be shared among the IoT devices and/or passive IoT devices. For example, in one embodiment, the server may provide a distributed network service (e.g., a cloud service) that can represent each IoT device and/or passive IoT device with a device-specific globally unique identifier (e.g., a D_GUID), each IoT device group with a group-specific globally unique identifier (e.g., a G_GUID), and each shared resource with a resource-specific globally unique identifier (e.g., a R_GUID). Accordingly, the D_GUIDs, G_GUIDs, and R_GUIDs may be used to control or otherwise coordinate sharing the resources within an IoT device group and/or between different IoT device groups. In particular, the server may define permissions, rules, or other suitable policies that may be used to determine whether a particular device can access a shared resource, enable different IoT device groups to interact with each other and access resources in different IoT device groups, and regulate the usage associated with the resources (e.g., according to one or N users at a time, according to a maximum duration that a particular client can access a shared resource, according to location or time, etc.).

For example, in one embodiment, the server may carry out the method 500 to provision one or more D_GUIDs that represent the various IoT devices and/or passive IoT devices. Additionally, in response to a new device powering up or otherwise registering with the server after connecting to the IoT network, a new D_GUID may be allocated to the new device to allow the new device to be reached and various properties may be associated with the D_GUID allocated to the new device (e.g., a description, location, type, etc.). In one embodiment, the server may further provision R_GUIDs that correspond to resources shared within the IoT network on which devices may need to operate or with which the device may otherwise need to interact. For example, the resources may generally include water, electricity, sunlight, roads, food, or any other suitable resource, which may be uniquely identified within a context according to location, household, or other suitable attributes associated with the resources. Furthermore, the server may provision G_GUIDs that represent each IoT device group that works together (e.g., in a household, a lawn sprinkler, water heater, refrigerator, bathtub, etc. may all operate on shared water resources). The G_GUIDs may further include various attributes that define a context associated with the IoT device group (e.g., household, location, owner, etc.) and the resources shared therein. In one embodiment, the server may further be provisioned with various policies to define hierarchies, rankings, priorities, or other relationships among the various IoT devices and passive IoT devices in addition to the IoT device groups to which they are allocated, the resources shared therein, and any pre-emption policies to control contending access to the resources, which may then be used in the network-based group management and floor control mechanism disclosed herein to coordinate access to the shared resources, as will be described in further detail below.

Figure 6A:
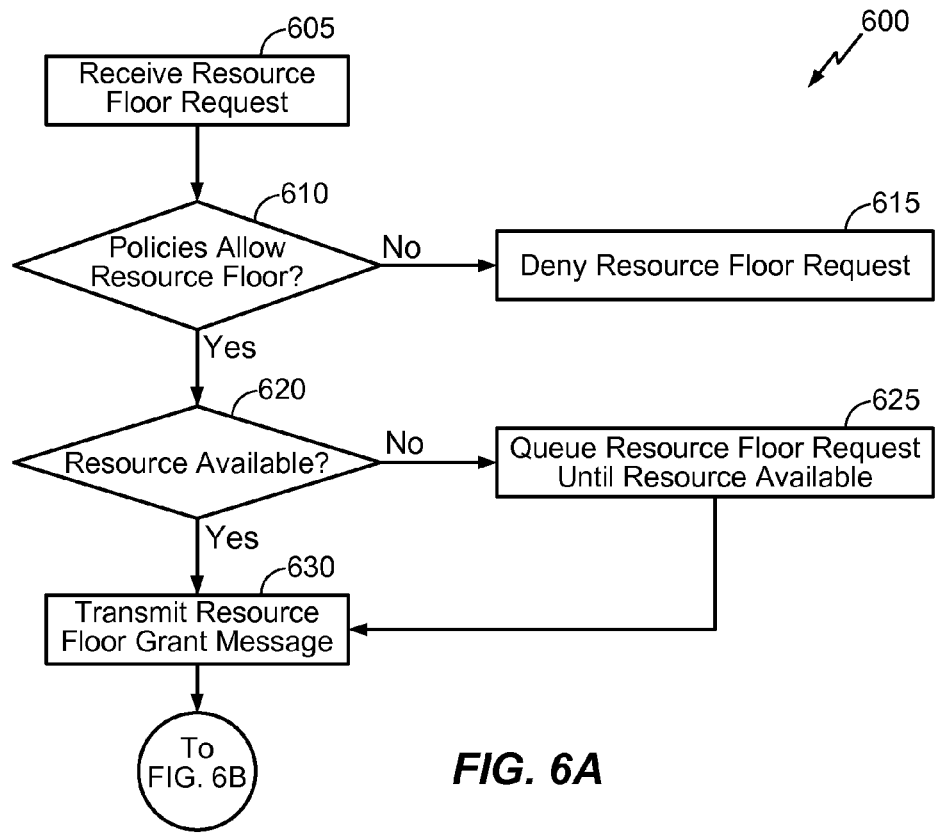
FIGS. 6A-B illustrates an exemplary method that a server, IoT group owner, or other suitable management entity may perform to coordinate resource sharing in machine-to-machine communication using a network-based group management and floor control mechanism according to various aspects of the disclosure.
Figure 6B:
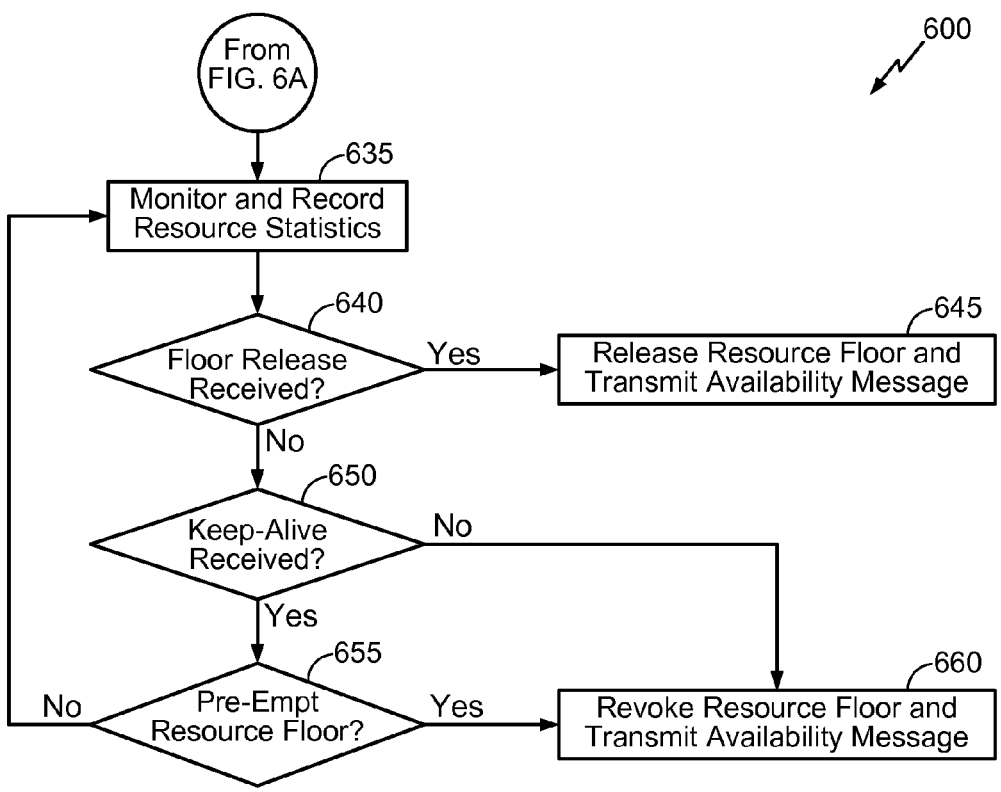

According to various aspects of the disclosure, FIGS. 6A-B illustrates an exemplary method 600 that a server, an IoT group owner, or another suitable management entity may perform to coordinate resource sharing in machine-to-machine communication using a network-based group management and floor control mechanism. In particular, in response to having suitably provisioned the server with the various D_GUIDs, G_GUIDs, R_GUIDs, and policies, the server may then discover the various IoT device groups and the various resources shared thereby. For example, in one embodiment, an R_GUID may be statically provisioned to or otherwise associated with one or more D_GUIDs that correspond to devices that require access to a certain shared resource. In another example, a device that wishes to access a certain shared resource may query the server based on a location, description, or other suitable attributes associated therewith, and the device may then select an appropriate resource from a list that the server returns to the device. Further still, in one embodiment, one or more resources may be tagged with an RFID, bar code, or other suitable data that the IoT devices can read in order to dynamically discover the resources. Furthermore, in one embodiment, the server may employ a query mechanism to discover the IoT device groups based on context or information input to a suitable user interface (e.g., owners associated with two IoT device groups may exchange G_GUIDs to initiate interaction between the two IoT device groups). In another example, based on the permissions, rules, or other policies provisioned to the server, two or more IoT device groups can be permanently or temporarily merged to enable the merged groups to use the resources shared within each IoT device group.

Accordingly, in response to having suitably discovered the various IoT device groups and the various resources shared thereby, the server may then coordinate shared access to the resources based on machine-to-machine communications using the network-based group management and floor control mechanism. For example, the server may receive a Floor Request message from a device that needs to use a shared resource at block 605 and subsequently determine whether or not to grant the floor at block 610 based on the policies that were previously provisioned to the server. In one embodiment, if the server determines that the policies do not permit the requesting device to have the floor, the server may then deny the Floor Request message at block 615. Otherwise, if the server determines that the policies permit the requesting device to have the floor, the server may then determine whether the shared resource is currently available at block 620 (e.g., the shared resource may be unavailable if another higher-priority device sent a Floor Request message at substantially the same time or another higher-priority device that cannot be pre-empted currently has the floor). In one embodiment, in response to the server determining that the shared resource is available (e.g., because the shared resource is unoccupied, a lower-priority device that can be pre-empted currently holds the floor, etc.), the server may then transmit a Floor Grant message to the requesting device at block 630, wherein the Floor Grant message may generally permit the requesting device to use the resource in that the requesting device granted the floor may use, access, consume, or otherwise the resource (or a portion thereof) exclusively, or alternatively prevent or otherwise block other devices from using the resource or portions thereof. In other words, the floor may grant the requesting device permission to "occupy" the resource or a certain portion of the resource, which may involve consuming the resource, using the resource, accessing the resource, blocking usage or consumption associated with the resource, or any combination thereof. Otherwise, if the server determines that the shared resource is unavailable (e.g., because the shared resource is occupied, a higher-priority device that cannot be pre-empted currently holds the floor, etc.), the server may queue the Floor Request message at block 625 until the resource becomes available and the Floor Request message reaches the top of the queue, at which time the server may transmit the Floor Grant message to the requesting device at block 630 in a substantially similar manner to that described above.

In one embodiment, the server may further monitor and record data and statistics that relate to each resource shared or otherwise used within a particular IoT device group at block 635, including the resource to which the requesting device was granted the floor. Furthermore, the provisioned permissions, rules, and other policies may be used in blocks 610 and/or 620 to regulate whether to grant the floor to a certain requesting device based on the data and statistics monitored and recorded at block 635. Moreover, in one embodiment, the various devices may query the server to determine an available quota associated with a particular resource based on the statistics maintained based on the monitoring performed at block 635 (e.g., an amount of the resource that can be consumed or occupied while the device holds the floor). For example, if a hot water resource is running low, a user requesting the floor to occupy the hot water resource may be notified to not take a shower or the availability associated with the hot water resource may be used to control whether or not a request to obtain the floor to occupy the hot water resource will be granted or denied.

Accordingly, in response to the server granting the Floor Request at block 630, the requesting device may be granted the floor to the resource and the server may start a timer to regulate the duration associated with the floor. For example, in one embodiment, any particular device that has been granted the floor to a certain resource may be required to periodically exchange a keep-alive message with the server in order to ensure that the connection with the device holding the floor has not been lost. However, if the device that currently has the floor no longer needs to use or otherwise occupy the shared resource, the device may transmit a Floor Release message to the server. As such, the server may determine whether a Floor Release message was received at block 640, in which case the server may release the previously granted floor and make the resource available to other devices at block 645. For example, block 645 may include granting the floor to another device that requested the floor while the resource was already occupied, in which case the method 600 may return to blocks 625 and/or 630 to grant the floor to the other device. In another example, if no other devices requested the floor while the resource was occupied, the server may broadcast a message throughout the IoT network to indicate that the resource has become available at block 645.

In one embodiment, if the server determines at block 640 that a Floor Release message has not been received, the server may then determine whether a keep-alive message was received from the device holding the floor at block 650. As such, in response to determining that a keep-alive message was not received from the device that currently has the floor, the server may assume that the device has lost connectivity and then revoke the floor granted thereto at block 660. Otherwise, if a keep-alive message was received, the server may then determine whether to pre-empt the device currently holding the floor based on the hierarchies, rankings, or other priorities associated with the IoT device groups at block 655, in which case the server may similarly revoke the floor granted to the device currently occupying the resource at block 660. For example, the pre-emption feature may allow another higher ranking or higher priority requesting device to terminate the floor granted to another device (e.g., if a clothes washer is running and currently occupying a water resource and someone wants to use the shower, the shower may pre-empt the floor that the washer has on the water resource). Otherwise, if the server determines that a Floor Release message has not been received and that a keep-alive message has been received prior to the timer expiring, and further that no pre-emption policies apply to the currently granted resource floor, the server may generally restart the timer to renew the floor that the device currently holds to the resource and return to block 635 to continue monitoring and recording the usage associated with the resource.

Figure 7:
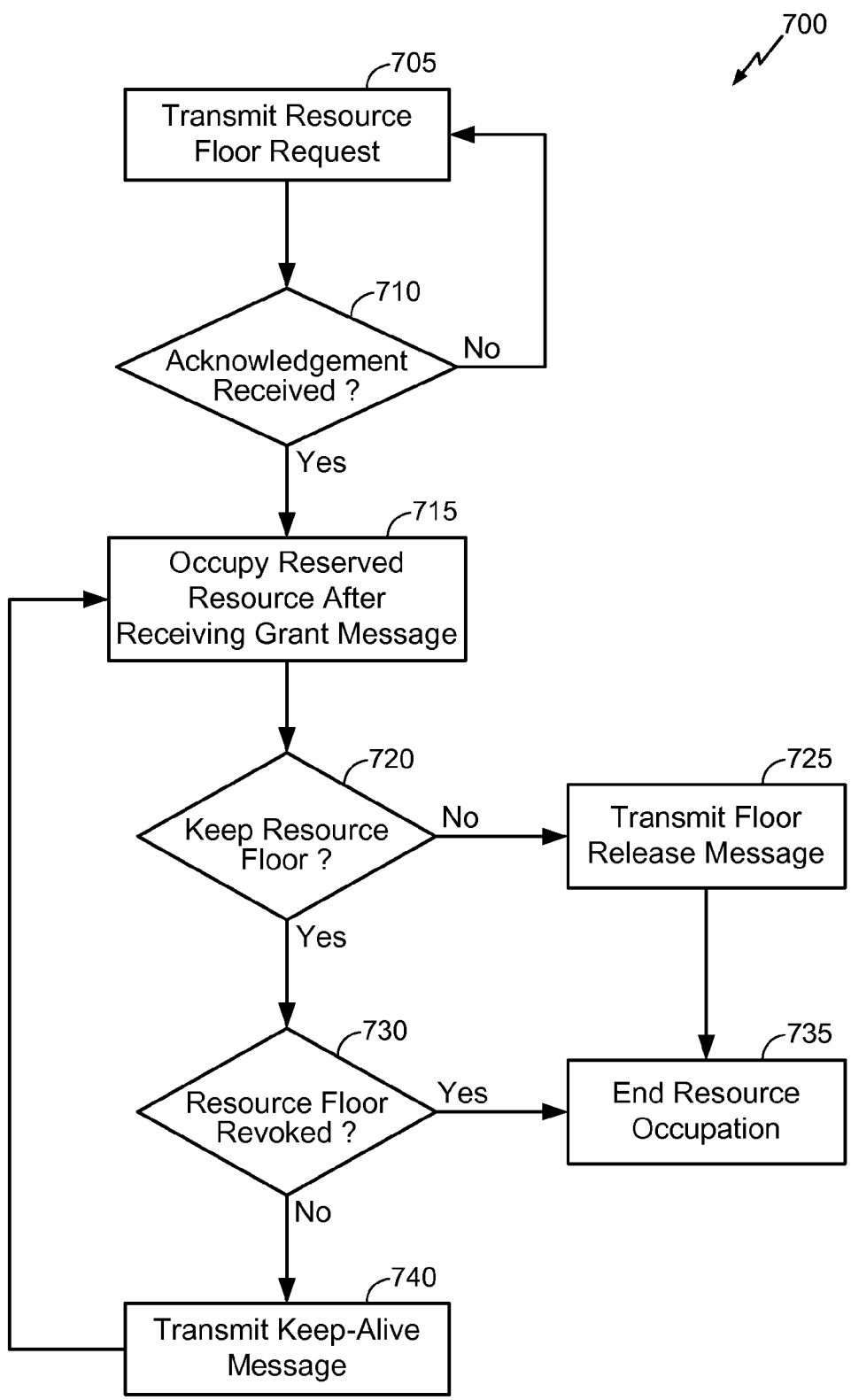
FIG. 7 illustrates an exemplary method that an IoT device or member within an IoT device group may perform to coordinate resource sharing in machine-to-machine communication using a network-based group management and floor control mechanism according to various aspects of the disclosure.

According to various aspects of the disclosure, FIG. 7 illustrates an exemplary method 700 that an IoT device or other suitable member within a particular IoT device group may perform to share resources in machine-to-machine communication using a network-based group management and floor control mechanism that can coordinate the resource sharing. In particular, in response to a server having suitably discovered the particular IoT device group, the member IoT device, and various shared resources that the member IoT device shares with other members in the IoT device group and/or members in other IoT device groups, the server may generally allocate a group-specific globally unique identifier (e.g., a G_GUID) to the IoT device group, allocate a device-specific globally unique identifier (e.g., a D_GUID) to the member IoT device group, and allocate a resource-specific globally unique identifier (e.g., a R_GUID) to each shared resource. As such, in response to the IoT device needing to use, consume, access, or otherwise occupy a shared resource, the IoT device may transmit a Floor Request message that includes the R_GUID associated with the shared resource to the server at block 705. Furthermore, in one embodiment, the Floor Request message transmitted to the server at block 705 may include the D_GUID allocated to the requesting IoT device and/or the G_GUID allocated to the IoT device group that includes the requesting IoT device in addition to the R_GUID associated with the shared resource. Further still, in one embodiment, the Floor Request message transmitted to the server at block 705 may include a query to determine an available quota associated with the shared resource and/or an amount of the available quota that the requesting IoT device can use, consume, access, or otherwise occupy if the server grants the Floor Request message. Accordingly, those skilled in the art will appreciate that the Floor Request message transmitted to the server at block 705 may include various attributes or other suitable parameters that relate to the IoT device requesting the floor to occupy the shared resource.

In one embodiment, in response to the requesting IoT device transmitting the Floor Request message to the server at block 705, the requesting IoT device may then wait to receive a Floor Grant message or another suitable message that acknowledges the Floor Request message from the server at block 710. As such, if the requesting IoT device does not receive the Floor Grant message or another message from the server that acknowledges the Floor Request message, IoT device may then retransmit the Floor Request message at block 705 and continue to wait to receive the Floor Grant message or other message that acknowledges the Floor Request message from the server at block 710. Alternatively, if the requesting IoT device determines that a message denying the Floor Request message was received at block 710 (e.g., because another device currently holds the floor to the shared resource), the requesting IoT device may wait to receive a message from the server indicating that the floor has been released or otherwise become available before retransmitting the Floor Request message at block 705. In another exemplary embodiment, the acknowledgement received at block 710 may indicate that although the Floor Request message cannot be currently granted (e.g., because another higher-priority device currently holds the floor to the shared resource), the Floor Request message has been placed into a queue until the device holding the floor has sent a Floor Release message to release the floor and/or the currently held floor has been revoked, whereby the acknowledgement received at block 710 may indicate that Floor Request message transmitted at block 705 will be granted upon reaching the top of the queue.

Accordingly, in response to receiving a message from the server that grants the Floor Request message, the requesting IoT device may be granted the floor to exclusively use, access, consume or otherwise occupy the shared resource (or a portion of the shared resource), wherein the server may indicate the particular rights that the requesting IoT device has to exclusively use, access, consume or otherwise occupy the shared resource (or the portion thereof) in the grant message. For example, in one embodiment, the acknowledgement received at block 710 may include the grant message. Alternatively, if the acknowledgement received at block 710 indicated that Floor Request message was queued, the grant message may be received subsequent to the acknowledgement received at block 710 (e.g., upon the Floor Request message reaching the top of the queue). In either case, in response to the requesting IoT device receiving the message from the server that grants the floor to the requesting IoT device, the requesting IoT device may then occupy the shared resource reserved thereto or a certain portion of the shared resource reserved thereto at block 715, wherein the IoT device holding the floor may consume the shared resource, use the shared resource, access the shared resource, and/or block usage or consumption associated with the shared resource while occupying the shared resource at block 715. For example, the shared resource may be a garage door and the IoT device holding the floor may be a sensor device coupled to or in proximity to the garage door, wherein the sensor device may obtain the floor and occupy the shared garage door resource in response to detecting a person underneath the garage door to prevent any interaction therewith that may close the garage door and thereby protect the person standing underneath from injury. Additionally, in one embodiment, the server may continuously or periodically query with the IoT device holding the floor to the shared resource and/or the shared resource itself to maintain data and statistics that relate to the resource occupation that occurs at block 715, which may be correlated with the IoT device group that includes the IoT device holding the floor, other IoT devices having similar characteristics, or any other suitable information that may be relevant to coordinating the shared resource (e.g., to regulate whether to grant the floor to a certain requesting device based on availability associated with the shared resource, etc.).

In one embodiment, when the server grants the Floor Request message that was transmitted at block 705, the server may start a timer to regulate the duration associated with the floor. For example, in one embodiment, the IoT device that has been granted the floor to occupy the shared resource may be required to periodically exchange a keep-alive message with the server in order to ensure that the connection between the server and the device holding the floor has not been lost. However, if the IoT device that currently has the floor no longer needs to use or otherwise occupy the shared resource, the IoT device may decide to release the floor at block 720 and subsequently transmit a Floor Release message to the server at block 725 and terminate occupying the resource at block 735 to make the shared resource available to other devices. For example, in response to the IoT device holding the floor transmitting the Floor Release message at block 725 and then terminating the shared resource occupation at block 735, the server may then grant the floor to another device that had a Floor Request message queued while the IoT was occupying the shared resource. In one embodiment, if the IoT device that currently has the floor wishes to keep the floor to the shared resource, the IoT device may then determine whether a message revoking the floor granted to the IoT device was received from the server at block 730. For example, in one embodiment, the server may pre-empt the floor currently granted to the IoT device if another higher-priority device requests the floor, the IoT device holding the floor fails to transmit a keep-alive message before the timer expires, the IoT device has exceeded the quota allocated thereto, or other relevant policies trigger pre-empting the currently granted floor (e.g., if the IoT device corresponds to a clothes washer currently occupying a shared water resource and someone wants to use the shower, the server may pre-empt the floor that the washer has on the shared water resource to allow the shower to use the shared water resource). As such, if the IoT device determines that the server revoked the floor at block 730, the IoT device may terminate occupying the resource at block 735 in a substantially similar manner to that described above in relation to the Floor Release message in which the IoT device voluntarily surrenders the floor.

In one embodiment, if the IoT device that currently has the floor wishes to keep the floor to the shared resource and no message revoking the floor granted to the IoT device has been received, the IoT device may transmit a keep-alive message to the server at block 740 and the server may then restart the timer to renew the floor that the device currently has to exclusively occupy the resource (or a portion thereof) in response to receiving the keep-alive message prior to the timer expiring. Accordingly, the method 700 may then return to block 715 and the IoT device may continue to occupy the shared resource during the renewed floor period in an iterative manner in coordination with the server in a substantially similar manner to that described in further detail above.

Those skilled in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those skilled in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted to depart from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an IoT device. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically and/or optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for coordinated resource sharing among Internet of Things (IoT) devices, comprising:
    identifying, at a server, a plurality of IoT devices that operate on a uniquely identified shared IoT resource connected to a personal IoT network, wherein the uniquely identified shared IoT resource comprises a consumable, physical commodity;
    provisioning, at the server, an IoT device group having the plurality of IoT devices as members based at least in part on the plurality of IoT devices being configured to operate on the uniquely identified shared IoT resource, wherein the plurality of IoT devices in the IoT device group are configured to communicate peer-to-peer using a common messaging protocol;
    receiving, at the server, a message requesting exclusive permission to occupy at least a portion of the uniquely identified shared IoT resource, the message received via a supervisor interface from a first IoT device among the plurality of IoT devices that are members of the IoT device group;
    granting, to the first IoT device, the exclusive permission to occupy at least the portion of the uniquely identified shared IoT resource according to a quota allocated to the first IoT device; and
    transmitting, from the server to the first IoT device, a message indicating that the first IoT device has been granted the exclusive permission to occupy at least the portion of the uniquely identified shared IoT resource according to the allocated quota, wherein the granted exclusive permission to occupy at least the portion of the uniquely identified shared IoT resource is regulated such that the granted exclusive permission to occupy at least the portion of the uniquely identified shared IoT resource is pre-empted in response to the first IoT device exceeding the quota allocated thereto.

2. The method recited in claim 1, further comprising:
    transmitting, from the server to the first IoT device, a message that revokes the granted exclusive permission to occupy at least the portion of the uniquely identified shared IoT resource.

3. The method recited in claim 2, wherein the message revoking the exclusive permission to occupy at least the portion of the uniquely identified shared IoT resource is transmitted in response to one or more of a timeout period expiring without the server receiving a keep-alive message from the first IoT device, an IoT device with a higher priority than the first IoT device requesting access to the uniquely identified shared IoT resource, or based on one or more policies that regulate access to the uniquely identified shared IoT resource.

4. The method recited in claim 1, further comprising:
    making the uniquely identified shared IoT resource available in response to receiving a message from the first IoT device that releases the granted exclusive permission to occupy at least the portion of the uniquely identified shared IoT resource.

5. The method recited in claim 1, wherein the granted exclusive permission to occupy at least the portion of the uniquely identified shared IoT resource comprises a floor that blocks other IoT devices from accessing the portion of the uniquely identified shared IoT resource while the first IoT device holds the floor, and wherein the method further comprises:

queuing a message received from at least one of the other IoT devices that requests access to the portion of the uniquely identified shared IoT resource that the first IoT device has been granted the exclusive permission to occupy while the first IoT device holds the floor.

6. The method recited in claim 1, further comprising:
queuing the message from the first IoT device requesting the exclusive permission to occupy at least the portion of the uniquely identified shared IoT resource in response to determining that one or more other IoT devices currently hold a floor to occupy at least the portion of the uniquely identified shared IoT resource, wherein the server grants the first IoT device the exclusive permission to occupy at least the portion of the uniquely identified shared IoT resource in response to the one or more other IoT devices no longer holding the floor to occupy at least the portion of the uniquely identified shared IoT resource.

7. The method recited in claim 1, further comprising:
receiving a contending message that requests access to the portion of the uniquely identified shared IoT resource from a second IoT device among the plurality of IoT devices that are members of the IoT device group; and
determining whether to grant the exclusive permission to occupy at least the portion of the uniquely identified shared IoT resource to the first IoT device or the second IoT device based on one or more policies.

8. The method recited in claim 1, further comprising:
allocating a device-specific globally unique identifier (D_GUID) to each of the plurality of IoT devices that operate on the uniquely identified shared IoT resource in response to receiving a registration request from each respective IoT device;
allocating a group-specific globally unique identifier (G_GUID) to the IoT device group; and
associating the D_GUID allocated to each respective IoT device and the G_GUID allocated to the IoT device group with one or more attributes based on one or more contexts associated with each respective IoT device and further based on a resource-specific globally unique identifier (R_GUID) allocated to the uniquely identified shared IoT resource.

9. The method recited in claim 8, further comprising:
receiving, at the server, a message that requests the R_GUID allocated to the uniquely identified shared IoT resource from the first IoT device;
selecting one or more uniquely identified shared IoT resources based on the one or more attributes associated with the D_GUID allocated to the first IoT device; and
transmitting a list that includes the R_GUID allocated to the one or more uniquely identified shared IoT resources to the first IoT device, wherein the first IoT device selects the R_GUID allocated to the uniquely identified shared IoT resource that the first IoT device has requested the exclusive permission to occupy from the transmitted list.

10. The method recited in claim 1, wherein the message requesting the exclusive permission to occupy at least the portion of the uniquely identified shared IoT resource indicates the portion of the uniquely identified shared IoT resource that the first IoT device requests exclusive permission to occupy, and wherein the message indicating that the first IoT device has been granted the exclusive permission to occupy at least the portion of the uniquely identified shared IoT resource indicates the allocated quota to which the first IoT device has been granted the exclusive permission to occupy.

11. The method recited in claim 1, further comprising:
maintaining statistics that relate to usage associated with the uniquely identified shared IoT resource.

12. An apparatus, comprising:
at least one processor configured to identify a plurality of Internet of Things (IoT) devices configured to operate on a uniquely identified shared IoT resource connected to a personal IoT network, wherein the uniquely identified shared IoT resource comprises a consumable, physical commodity, the at least one processor further configured to provision an IoT device group having the plurality of IoT devices as members based at least in part on the plurality of IoT devices being configured to operate on the uniquely identified shared IoT resource, wherein the plurality of IoT devices in the IoT device group are configured to communicate peer-to-peer using a common messaging protocol;
a receiver configured to receive a message requesting exclusive permission to occupy at least a portion of the uniquely identified shared IoT resource, the message received via a supervisor interface from a first IoT device among the plurality of IoT devices that are members of the IoT device group, wherein the at least one processor is further configured to grant, to the first IoT device, the exclusive permission to occupy at least the portion of the uniquely identified shared IoT resource according to a quota allocated to the first IoT device; and
a transmitter configured to transmit, to the first IoT device, a message indicating that the first IoT device has been granted the exclusive permission to occupy at least the portion of the uniquely identified shared IoT resource according to the allocated quota, wherein the granted exclusive permission to occupy at least the portion of the uniquely identified shared IoT resource is regulated such that the granted exclusive permission to occupy at least the portion of the uniquely identified shared IoT resource is pre-empted in response to the first IoT device exceeding the quota allocated thereto.

13. The apparatus recited in claim 12, wherein the transmitter is further configured to:
transmit a message that revokes the granted exclusive permission to occupy at least the portion of the uniquely identified shared IoT resource to the first IoT device.

14. The apparatus recited in claim 13, wherein the message revoking the exclusive permission to occupy at least the portion of the uniquely identified shared IoT resource is transmitted in response to one or more of a timeout period expiring without receiving a keep-alive message from the first IoT device, an IoT device with a higher priority than the first IoT device requesting access to the uniquely identified shared IoT resource, or based on one or more policies that regulate access to the uniquely identified shared IoT resource.

15. The apparatus recited in claim 12, wherein the at least one processor is further configured to:
make the uniquely identified shared IoT resource available in response to a message from the first IoT device that releases the granted exclusive permission to occupy at least the portion of the uniquely identified shared IoT resource.

16. The apparatus recited in claim 12, wherein the granted exclusive permission to occupy at least the portion of the uniquely identified shared IoT resource comprises a floor that blocks other IoT devices from accessing the portion of the uniquely identified shared IoT resource while the first IoT device holds the floor, and wherein the at least one processor is further configured to:

queue a message received from at least one of the other IoT devices that requests access to the portion of the uniquely identified shared IoT resource that the first IoT device has been granted the exclusive permission to occupy while the first IoT device holds the floor.

17. The apparatus recited in claim 12, wherein the at least one processor is further configured to:

queue the message from the first IoT device requesting the exclusive permission to occupy at least the portion of the uniquely identified shared IoT resource in response to one or more other IoT devices currently holding a floor to occupy at least the portion of the uniquely identified shared IoT resource, wherein the first IoT device is granted the exclusive permission to occupy at least the portion of the uniquely identified shared IoT resource in response to the one or more other IoT devices no longer holding the floor to occupy at least the portion of the uniquely identified shared IoT resource.

18. The apparatus recited in claim 12, wherein:

the receiver is further configured to receive a contending message that requests access to the portion of the uniquely identified shared IoT resource from a second IoT device among the plurality of IoT devices that are members of the IoT device group; and the at least one processor is further configured to determine whether to grant the exclusive permission to occupy at least the portion of the portion of the uniquely identified shared IoT resource to the first IoT device or the second IoT device based on one or more policies.

19. The apparatus recited in claim 12, wherein the at least one processor is further configured to:

allocate a device-specific globally unique identifier (D_GUID) to each of the plurality of IoT devices that operate on the uniquely identified shared IoT resource in response to a registration request received from each respective IoT device;

allocate a group-specific globally unique identifier (G_GUID) to the IoT device group; and associate the D_GUID allocated to each respective IoT device and the G_GUID allocated to the IoT device group with one or more attributes based on one or more contexts associated with each respective IoT device and further based on a resource-specific globally unique identifier (R_GUID) allocated to the uniquely identified shared IoT resource.

20. The apparatus recited in claim 19, wherein:

the receiver is further configured to receive a message from the first IoT device that requests the R_GUID allocated to the uniquely identified shared IoT resource;

the at least one processor is further configured to select one or more uniquely identified shared IoT resources based on the one or more attributes associated with the D_GUID allocated to the first IoT device; and the transmitter is further configured to transmit a list that includes the R_GUID allocated to the one or more uniquely identified shared IoT resources to the first IoT device, wherein the first IoT device selects the R_GUID allocated to the uniquely identified shared IoT resource that the first IoT device has requested the exclusive permission to occupy from the transmitted list.

21. The apparatus recited in claim 12, wherein the message requesting the exclusive permission to occupy at least the portion of the uniquely identified shared IoT resource indicates the portion of the uniquely identified shared IoT resource that the first IoT device requests exclusive permission to occupy, and wherein the message indicating that the first IoT device has been granted the exclusive permission to occupy at least the portion of the uniquely identified shared IoT resource indicates the allocated quota to which the first IoT device has been granted the exclusive permission to occupy.

22. An Internet of Things (IoT) device, comprising:

at least one processor configured to operate on a uniquely identified shared IoT resource connected to a personal IoT network, wherein the uniquely identified shared IoT resource comprises a consumable, physical commodity, and wherein the IoT device is one of a plurality of IoT devices that are members in an IoT device group based at least in part on the plurality of IoT devices being configured to operate on the uniquely identified shared IoT resource, wherein the plurality of IoT devices in the IoT device group are configured to communicate peer-to-peer using a common messaging protocol;

a transmitter configured to transmit, to a server via a supervisor interface, a message requesting exclusive permission to occupy at least a portion of the uniquely identified shared IoT resource; and a receiver configured to receive, from the server via the supervisor interface, a message indicating that the IoT device has been granted the exclusive permission to occupy at least the portion of the uniquely identified shared IoT resource according to a quota allocated to the IoT device, wherein the granted exclusive permission to occupy at least the portion of the uniquely identified shared IoT resource is regulated such that the granted exclusive permission to occupy at least the portion of the uniquely identified shared IoT resource is pre-empted in response to the member IoT device exceeding the quota allocated thereto.

23. A method for coordinated resource sharing among Internet of Things (IoT) devices, comprising:

operating on a uniquely identified shared IoT resource connected to a personal IoT network by an IoT device, wherein the uniquely identified shared IoT resource comprises a consumable, physical commodity, and wherein the IoT device is one of a plurality of IoT devices that are members in an IoT device group based at least in part on the plurality of IoT devices being configured to operate on the uniquely identified shared IoT resource, wherein the plurality of IoT devices in the IoT device group are configured to communicate peer-to-peer using a common messaging protocol;

transmitting, from the IoT device to a server via a supervisor interface, a message requesting exclusive permission to occupy at least a portion of the uniquely identified shared IoT resource; and receiving, from the server via the supervisor interface, a message indicating that the IoT device has been granted the exclusive permission to occupy at least the portion of the uniquely identified shared IoT resource according to a quota allocated to the IoT device, wherein the granted exclusive permission to occupy at least the portion of the uniquely identified shared IoT resource is regulated such that the granted exclusive permission to occupy at least the portion of the uniquely identified shared IoT resource is pre-empted in response to the IoT device exceeding the quota allocated thereto.

24. The method recited in claim 23, further comprising: receiving, from the server, a message that revokes the granted exclusive permission to occupy at least the portion of the uniquely identified shared IoT resource based on one or more of a timeout period expiring without the IoT device transmitting a keep-alive message to the server, an IoT device with a higher priority than the IoT device requesting access to the uniquely identified shared IoT resource, or one or more policies regulating the IoT device occupying the uniquely identified shared IoT resource.

25. The method recited in claim 23, further comprising: transmitting, to the server, a message that releases the granted exclusive permission to occupy at least the portion of the uniquely identified shared IoT resource.

26. The method recited in claim 23, wherein the granted exclusive permission to occupy at least the portion of the uniquely identified shared IoT resource comprises a floor that blocks other IoT devices from accessing the portion of the uniquely identified shared IoT resource while the IoT device holds the floor.

27. The method recited in claim 23, further comprising: transmitting a registration request to the server; and receiving, from the server, a device-specific globally unique identifier (D_GUID) allocated to the IoT device and a group-specific globally unique identifier (G_GUID) allocated to the IoT device group that includes the IoT device in response to the registration request.

28. The method recited in claim 27, further comprising: transmitting, to the server, a message that requests a resource-specific globally unique identifier (R_GUID) allocated to the uniquely identified shared IoT resource; receiving a list that includes the R_GUID allocated to the uniquely identified shared IoT resource; and selecting the R_GUID allocated to the uniquely identified shared IoT resource from the received list.

29. The method recited in claim 23, wherein the message requesting the exclusive permission to occupy at least the portion of the uniquely identified shared IoT resource indicates the portion of the uniquely identified shared IoT resource that the IoT device requests exclusive permission to occupy.

30. The method recited in claim 23, wherein the message indicating that the IoT device has been granted the exclusive permission to occupy at least the portion of the uniquely identified shared IoT resource indicates the allocated quota to which the IoT device has been granted the exclusive permission to occupy.

31. The method recited in claim 23, further comprising: receiving, from the server, a message indicating that the granted exclusive permission to occupy at least the portion of the uniquely identified shared IoT resource has been revoked based on the IoT device occupying an amount of the uniquely identified shared IoT resource that exceeds the quota allocated thereto.

32. The method recited in claim 23, wherein the uniquely identified shared IoT resource is mutually exclusive such that other IoT devices among the plurality of IoT devices that are members of the IoT device group are blocked from accessing the uniquely identified shared IoT resource while the IoT device holds the granted exclusive permission to occupy at least the portion of the uniquely identified shared IoT resource.

33. The method recited in claim 1, further comprising: determining, at the server, that the IoT device has occupied an amount of the uniquely identified shared IoT resource that exceeds the quota allocated thereto; transmitting, from the server to the IoT device, a message indicating that the granted exclusive permission to occupy at least the portion of the uniquely identified shared IoT resource has been revoked; and making the occupied amount of the uniquely identified shared IoT resource available to other IoT devices among the plurality of IoT devices that are members of the IoT device group that operate on the uniquely identified shared IoT resource.

34. The method recited in claim 33, wherein making the occupied amount of the uniquely identified shared IoT resource available to the other IoT devices comprises granting, to a second IoT device among the plurality of IoT devices that are members of the IoT device group, the exclusive permission to occupy at least the portion of the uniquely identified shared IoT resource based at least in part on the second IoT device having a queued request to occupy at least the portion of the uniquely identified shared IoT resource.

35. The method recited in claim 33, wherein making the occupied amount of the uniquely identified shared IoT resource available to the other IoT devices comprises broadcasting, to the plurality of IoT devices that are members of the IoT device group, a message indicating that the occupied amount of the uniquely identified shared IoT resource has become available.

36. The method recited in claim 1, wherein the uniquely identified shared IoT resource is mutually exclusive such that other IoT devices among the plurality of IoT devices that are members of the IoT device group are blocked from accessing the uniquely identified shared IoT resource while the IoT device holds the granted exclusive permission to occupy at least the portion of the uniquely identified shared IoT resource.

* * * * *